United States Patent
Pos

(10) Patent No.: US 10,321,770 B2
(45) Date of Patent: Jun. 18, 2019

(54) COLLAPSIBLE CHILD SEAT AND PUSHCHAIR COMPRISING SUCH A CHILD SEAT

(71) Applicant: CYBEX GmbH, Bayreuth (DE)

(72) Inventor: Martin Pos, Bayreuth (DE)

(73) Assignee: CYBEX GmbH, Bayreuth (DE)

( * ) Notice: Subject to any disclaimer, the term of this patent is extended or adjusted under 35 U.S.C. 154(b) by 10 days.

(21) Appl. No.: 15/551,998

(22) PCT Filed: Feb. 22, 2016

(86) PCT No.: PCT/EP2016/053624
§ 371 (c)(1),
(2) Date: Aug. 18, 2017

(87) PCT Pub. No.: WO2016/135074
PCT Pub. Date: Sep. 1, 2016

(65) Prior Publication Data
US 2018/0027989 A1    Feb. 1, 2018

(30) Foreign Application Priority Data

Feb. 23, 2015    (DE) .......................... 10 2015 102 538

(51) Int. Cl.
*B62B 9/12*    (2006.01)
*A47D 1/06*    (2006.01)
(Continued)

(52) U.S. Cl.
CPC ................ *A47D 1/06* (2013.01); *B62B 7/006* (2013.01); *B62B 7/142* (2013.01); *B62B 9/104* (2013.01);
(Continued)

(58) Field of Classification Search
CPC .......... A47D 1/006; B62B 7/006; B62B 7/00; B62B 9/00
See application file for complete search history.

(56) References Cited

U.S. PATENT DOCUMENTS 5,820,144 A * 10/1998 Wang ...................... B62B 9/185
280/47.38
6,386,575 B1 * 5/2002 Turner ...................... B62B 7/06
280/647
(Continued)

FOREIGN PATENT DOCUMENTS

EP    0479132 A1    4/1992
EP    2275321 A2    1/2011
(Continued)

OTHER PUBLICATIONS

"German Application Serial No. 10 2015 102 538.8, Examination Report dated Oct. 23, 2015", (dated Oct. 23, 2015), 9 pgs.
(Continued)

*Primary Examiner* — James A Shriver, II
*Assistant Examiner* — James J Triggs
(74) *Attorney, Agent, or Firm* — Schwegman Lundberg & Woessner, P.A.

(57)    ABSTRACT

A collapsible child seat (1) is disclosed, comprising a backrest (10), a seat surface element (20) and an adapter element (30, 30') or a plurality of adapter elements (30, 30') via which the child seat (1) can be connected to a pushchair frame, and a first locking element (50) via which the seat surface element (20) can be locked in relation to the adapter element (30, 30') or adapter elements (30, 30'), wherein the first locking element (50) is configured in such a way that by reducing the angle between the backrest (10) and the seat surface element (20) the locking of the seat surface element
(Continued)

(20) in relation to the adapter element (30, 30') or adapter elements (30, 30') can be released.

14 Claims, 20 Drawing Sheets

(51) Int. Cl.
*B62B 7/14* (2006.01)
*B62B 9/10* (2006.01)
*B62B 7/00* (2006.01)

(52) U.S. Cl.
CPC ............ *B62B 9/12* (2013.01); *B62B 2202/42* (2013.01); *B62B 2205/22* (2013.01)

(56) References Cited

U.S. PATENT DOCUMENTS

| | | | | |
|---|---|---|---|---|
| 2005/0017469 A1* | 1/2005 | Hill | ............................ | B62B 3/144 280/47.38 |
| 2007/0284924 A1* | 12/2007 | Gold | ..................... | B60N 2/2821 297/253 |
| 2008/0093824 A1* | 4/2008 | Chen | ........................ | B62B 7/08 280/642 |
| 2011/0068549 A1 | 3/2011 | Chen | | |
| 2011/0175406 A1 | 7/2011 | Zeng | | |
| 2011/0241395 A1* | 10/2011 | Homan | ................... | B62B 7/105 297/250.1 |

FOREIGN PATENT DOCUMENTS

WO  WO-2010050804 A1  5/2010
WO  WO-2014207689 A2  12/2014

OTHER PUBLICATIONS

"International Application No. PCT/EP2016/053624, International Search Report dated Apr. 29, 2016", w/ English Translation, (dated Apr. 29, 2016), 7 pgs.
"International Application No. PCT/EP2016/053624, Written Opinion dated Apr. 29, 2016", (dated Apr. 29, 2016), 6 pgs.
"International Application No. PCT/EP2016/053624, International Preliminary Report on Patentability dated Aug. 29, 2017", (dated Aug. 27, 2017), 9 pgs.

* cited by examiner

COLLAPSIBLE CHILD SEAT AND PUSHCHAIR COMPRISING SUCH A CHILD SEAT

PRIORITY APPLICATIONS

This application is a U.S. National Stage Filing under 35 U.S.C. 371 from International Application No. PCT/EP2016/053624, filed on 22 Feb. 2016, and published as WO2016/135074 on 1 Sep. 2016, which claims the benefit of priority to German Application No. 10 2015 102 538.8, filed on 23 Feb. 2015; which applications and publication are incorporated herein by reference in their entirety.

The invention relates to a collapsible child seat according to claim 1 and a baby carriage, in particular pushchair, buggy or similar vehicle for children, according to patent claim 14.

A multitude of child seats are known, which can be connected to the frame of a pushchair. The child seats are either permanently connected to the pushchair frame or are connected when required to the pushchair frame.

Child seats are however not in constant use and need to be stored during the time they are not required. When not in use a child seat should take up as little space as possible, so that it can be stowed away either on its own or together with the pushchair frame in a space-saving manner. To this end a child seat can often be collapsed.

The disadvantage of these known collapsible child seats is that collapsing them is very complicated and technically cumbersome. In particular a great number of hand movements need to be performed for collapsing a child seat in order to change it from a folded-out state (used state) into a collapsed state (unused state). The multitude of hand movements for collapsing it is often difficult to memorise, is not intuitive and mechanically complicated. Also with known collapsible child seats the danger of injury is considerable, in particular in that fingers and/or hands might get caught in the act of collapsing the child seat. Moreover known collapsible child seats are constructed in a technically expensive manner.

Therefore it is the requirement of the invention to propose a collapsible child seat, which is technically easy to collapse and which can be changed from a folded-out state into a collapsed state using technically simple movements.

This requirement is met by a collapsible child seat according to claim 1 and a pushchair according to claim 14.

In particular the requirement is met by a collapsible child seat, comprising a backrest, a seat surface element, one or more adapter elements by means of which the child seat can be connected to a pushchair frame, and a first locking element, by means of which the seat surface element relative to the one or more adapter elements can be locked, wherein the first locking element is designed such that by reducing the angle between the backrest and the seat surface element the locking of the seat surface element in relation to the adapter element or adapter elements can be released.

One advantage of this consists in that the locking of the seat surface element can be released in a technically simple manner. Releasing the locking of the seat surface element requires merely one hand movement/a mechanically simple movement, which can be performed by the user using just one hand. Due to the fact that releasing the locking of the seat surface element is simple, the child seat can be collapsed in a simple and quick manner. Because only one hand is required for releasing the locked seat surface element and thereby collapsing the child seat, the danger of injury, in particular of the user's finger and/or hand getting caught thereby injuring it, is reduced. In this way the safety of handling the child seat is increased. Moreover, the child seat is constructed in a technical simple manner and manufacture also is technically simple. In addition the movement of collapsing the child seat is intuitive so that even a user who is not familiar with the child seat, can quickly collapse the child seat. Moreover it is advantageous that as a result of moving the backrest in order to lower it/to fold it down, the seat surface element is also released in order to lower it/to fold it down. By continuing to reduce the angle between the backrest and the seat surface element, the backrest finally touches the seat surface element and moves the seat surface element (together with the backrest) towards the adapter element or adapter elements, thereby collapsing the child seat in a space-saving manner. Thus, using a single movement, the backrest and also the seat surface element can be collapsed (in direction of the adapter element or adapter elements), thereby collapsing the child seat.

The child seat may also comprise a retaining element for retaining a child in the child seat and a second locking element for locking the retaining element in relation to the seat surface element, wherein the second locking element is designed such that by reducing the angle between the backrest and the seat surface element, the locking of the retaining element in relation to the seat surface element is releasable. Due to the retaining element the child is securely retained in the child seat. Moreover it is advantageous that the locking of the retaining element can be released in a technically simple manner. A further advantage consists in that both the locking of the seat surface element and the locking of the retaining element can be released by one (mechanically simple) movement of the backrest. Thus, merely one single movement, i.e. a reduction in the angle between the backrest and the seat surface element, is required in order to release both the locking of the seat surface element and the locking of the retaining element. Thus the child seat is collapsible in a simple and quick manner. Moreover the danger of injury while collapsing the child seat is reduced, since only a simple movement (movement of the backrest in direction of the seat surface element) is required in order to release both lockings. The danger to the user of getting a finger or hand caught is thus distinctly reduced. In addition it is advantageous that as a result of the movement of the backrest in order to lower/fold the backrest down, the retaining element is also, apart from the seat surface element, released in order to lower it/fold it down. By continuing to reduce the angle between the backrest and the seat surface element, the backrest finally touches first the retaining element and moves the retaining element towards the seat surface element and subsequently touches the seat surface element and moves the seat surface element (together with the backrest and the retaining element) towards the adapter element or the adapter elements, whereby the child seat is collapsed in a space-saving manner.

In one embodiment the backrest and the seat surface element are rotatable about a first (common) rotary axis. One advantage of this is that the child seat can be designed and produced in a technical manner. In addition the first locking element may be designed in a technically simple manner. Also, as a result, the angle between backrest and seat surface element can be changed in a technically simple manner, in particular can be enlarged or reduced. Moreover, due to the fact that the backrest and the seat surface element are rotatable about the same rotary axis, the occurring forces acting on the child seat are distinctly reduced. As a result the child seat requires less dimensional stability. Thus more cost-effective materials can be used whereby the child seat can be produced in a low-cost manner.

The retaining element may be rotatable about a second rotary axis. One advantage of this is that the angle between retaining element and seat surface element and/or the one or more adapter elements can be changed in a technically simple manner.

In a further embodiment the backrest and the seat surface element are rotatable about a first rotary axis and the retaining element is rotatable about a second rotary axis, and the first rotatable axis is not identical to the second rotary axis. Due to the separation of the first rotary axis from the second rotary axis the occurring forces are distributed across the child seat. Thus excessive forces do not occur at any point on the child seat, in particular not on any of the two rotary axes, so that the child seat may be constructed in a less stable and thus lighter manner. It also means that manufacture is possible at lower cost.

The backrest may comprise a releasing device, in particular a releasing handle, wherein the releasing device is preferably arranged at an end of the backrest which faces away from the first locking element, and the first locking element for locking the backrest in relation to the adapter element or adapter elements is formed in one or more positions, wherein the child seat is constructed such that by operating the releasing device, in particular by pulling the releasing device away from the first locking element, the locking between the backrest and the adapter element or the adapter elements is releasable, so that the angle between the backrest and the adapter element or adapter elements can be changed, in particular reduced. One advantage of this is that the locking of the backrest (in relation to the seat surface element and as required, the retaining element) can be released in a technically simple manner. In particular merely one mechanically simple movement/hand movement (with one hand) is required in order to release the locking of the backrest. Following release of the locking of the backrest (in relation to the seat surface element and the one or more adapter elements) this can be moved (about the first rotary axis), and by reducing the angle between backrest and seat surface element both the locking of the seat surface element and the locking of retaining element are released. Thus by moving one hand the child seat can be collapsed in one continuous/uninterrupted movement (reduction of the angle between backrest and seat surface element), in other words, backrest, seat surface element and retaining element approach each other as far as possible/form the smallest possible angle relative to each other. As a result very little stowing space is required for stowing the (collapsed) child seat away when it is not required. Moreover the danger of injury during collapsing the child seat is further reduced because due to operating the releasing device and due to the subsequent movement of the backrest in order to reduce the angle between the backrest and the seat surface element, all lockings (locking of the backrest, locking of the seat surface element and locking of the retaining element) are released. This thus reduces the danger to the user of getting a finger or a hand caught and injuring himself.

The first locking element may comprise a first gearwheel for locking the seat surface element in relation to the adapter element or adapter elements, wherein the first gearwheel, when the seat surface element is in the release position, is rotatable about the first rotary axis. One advantage of this is that the child seat is designed and can be produced in a technically particularly simple manner. Moreover a gearwheel has a long service life and thus increases the longevity or service life of the child seat. In addition a gearwheel can be easily replaced, so that the child seat can be repaired in a technically simple and cost-effective manner. The release position of the seat surface element is the position in which the first locking (locking between seat surface element and adapter element or adapter elements) is released.

In a further embodiment the first gearwheel is movably arranged along the first rotary axis such that the first gearwheel can be brought out of engagement with the adapter element and/or the seat surface element and thus the locking of the seat surface element in relation to the adapter element or adapter elements is releasable. This means that the first locking/latching (locking/latching between the seat surface element and the adapter element or adapter elements) is designed, and can be released, in a technically simple manner.

The second locking element may be a second gearwheel for locking the retaining element in relation to the seat surface element, wherein the second gearwheel, in the release position of the retaining element, is rotatable about the second rotary axis. One advantage of this is that the child seat is constructed and can be produced in a technical particularly simple manner. Also, a gearwheel lasts for a long time and thus increases the longevity/service life of the child seat. In addition a gearwheel can be fitted easily and at low cost so that the child seat can be easily and cheaply repaired. The release position of the retaining element is the position, in which the second locking (locking between retaining element and seat surface element) is released.

The second gearwheel may be movably arranged along the second rotary axis such that the second gearwheel can be brought out of engagement with the retaining element so that the locking of the retaining element is releasable in relation to the seat surface element. Therefore the second locking (locking between the retaining element and the adapter element or adapter elements) is formed and can be released in a technically simple manner.

In a further embodiment the first locking element comprises a third gearwheel for locking the backrest in relation to the adapter element or adapter elements. One advantage of this is that the child seat is designed and can be produced, in a technically particularly simple manner. Also, a gearwheel lasts for a long time and thus increases the longevity/service life of the child seat. In addition a gearwheel can be fitted easily and at low cost so that the child seat can be easily and cheaply repaired.

In a further embodiment the child seat is designed in such a way that by operating the releasing device, the third gearwheel can be brought out of engagement in order to release a locking between the backrest and the adapter element or adapter elements. One advantage of this is that the locking element is constructed in a technically simple manner.

The first locking element may be connected to the second locking element via a cable pull, in particular a Bowden cable. With the aid of this it can be achieved that the first locking is released at a smaller (or larger) angle between the backrest and the seat surface element than the second locking between the retaining element and the seat surface element. In addition it is advantageous that the consecutive releasing/unlocking of the first locking and the second locking is particularly secure and reliable. In addition a cable pull is technically cost-effective so that the child seat can be produced in a low-cost manner. Also a cable pull is easily repairable so that the child seat can be repaired easily. This implies a reduction in manufacturing cost and repair cost. Moreover a cable pull is low in weight resulting in the child seat being low in weight and being easy to carry.

The requirement is also met in particular by a baby carriage, in particular a pushchair, buggy or similar vehicle for children, comprising a pushchair frame and a child seat with one or more of the above mentioned feature combinations. One advantage of this is that the locking of the seat surface element is easily released. To release the locking of the seat surface element it only requires one hand move/a mechanically simple movement which can be performed by the user with one hand. Due to the fact that the locking of the seat surface element is easy to release the child seat and thus also the pushchair including the child seat can be collapsed simply and quickly. The fact that only one hand is required for releasing the locking of the seat surface element and thus for collapsing the child seat/the pushchair, reduces the danger to the user that his finger or hand might get caught and thus injured. This increases the safety in operating the pushchair. Moreover the pushchair is constructed and may be produced, in a technically simple manner. Moreover the movement for collapsing the child seat/the pushchair is intuitive so that even a user who is not familiar with the child seat/the pushchair, can collapse it quickly. Moreover it is advantageous that as a result of moving the backrest in order to lower it/to fold it down, the seat surface element is also released in order to lower it/to fold it down. By continuing to reduce the angle between the backrest and the seat surface element, the backrest finally touches the seat surface element and moves the seat surface element (together with the backrest) towards the adapter element or adapter elements, thereby collapsing the pushchair including the child seat in a space-saving manner.

Preferred embodiments are revealed in the sub-claims. The invention will now be explained in detail with reference to the drawings and exemplary embodiments, in which:

Figure 17:
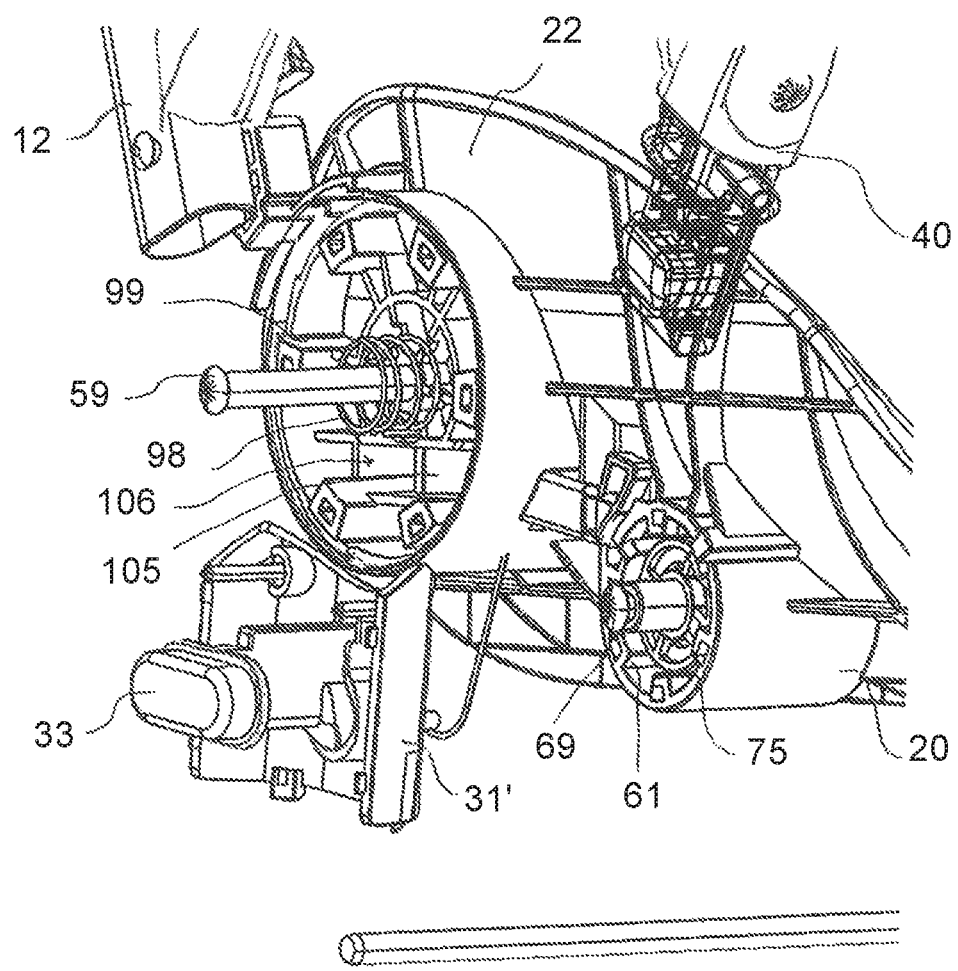
FIG. 17 shows a perspective view of the cut-out shown in FIG. 16.
Figure 18:
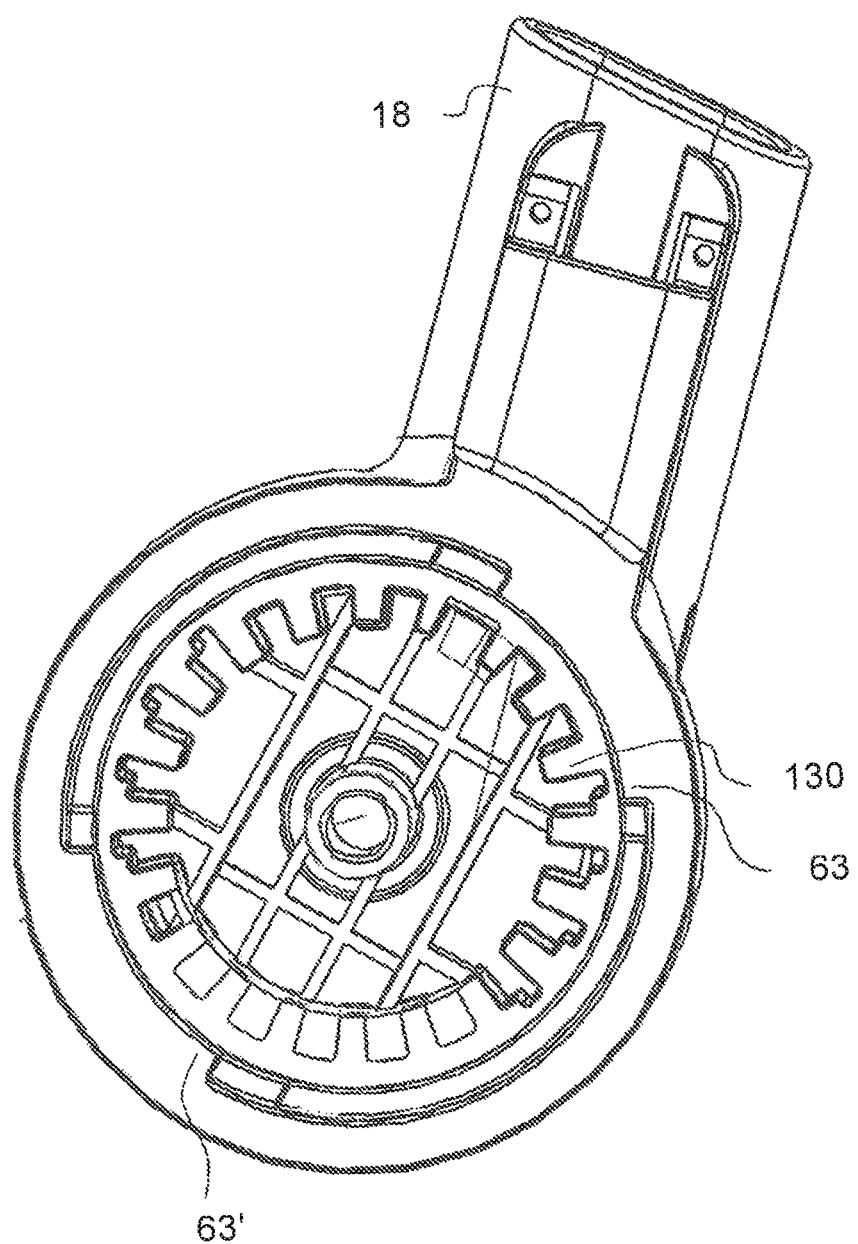
Figure 19:
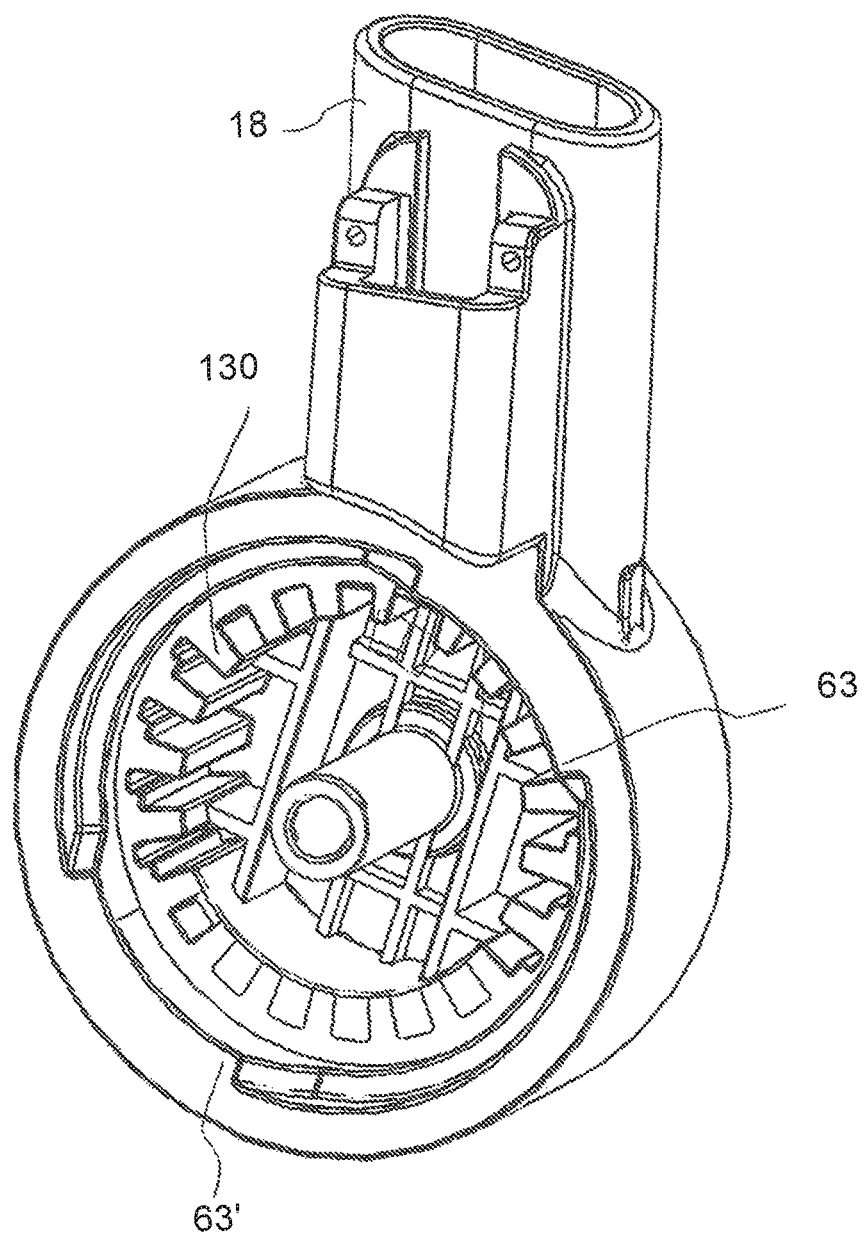

FIG. 18 a top view of a backrest connecting element from FIGS. 1-17;

FIG. 19 shows a perspective view of the cut-out shown in FIG. 18; and

Figure 20:
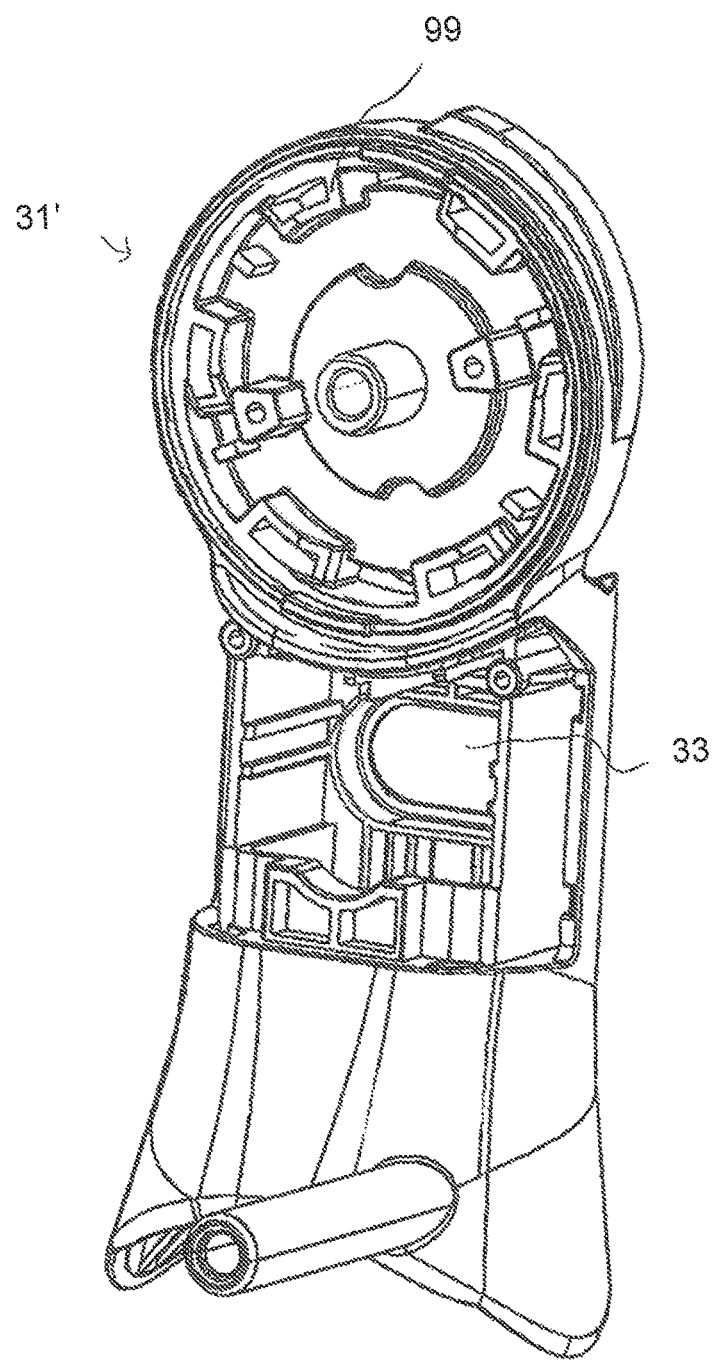

FIG. 20 shows a perspective view of the outer adapter element half of the child seat from FIGS. 1-17.

In the description hereunder the same reference symbols are used for identical or functionally identical parts.

Figure 1:
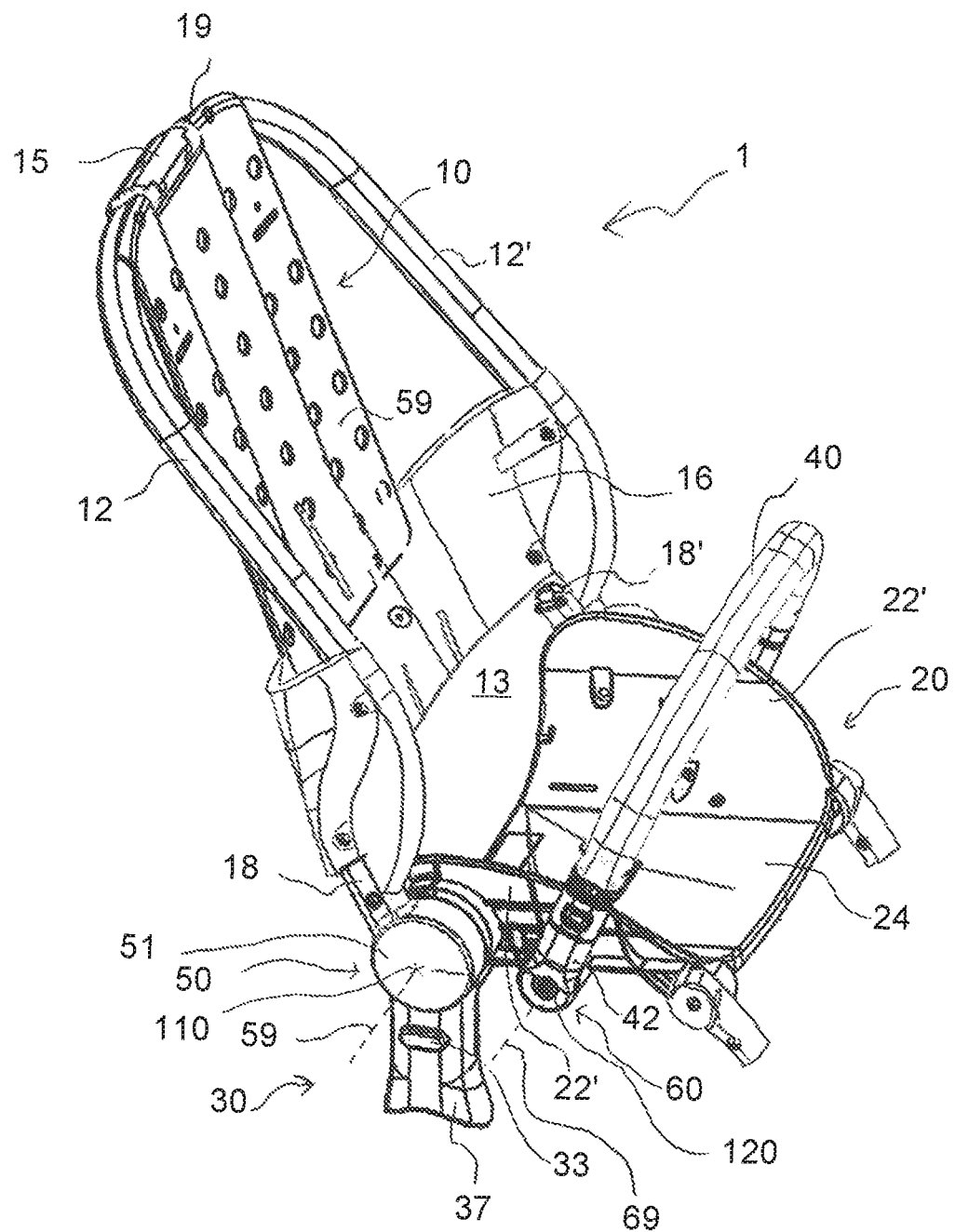
FIG. 1 shows a perspective view of a child seat according to the invention.

FIG. 1 shows a perspective view of an embodiment of the child seat 1 according to the invention. The child seat 1 comprises a backrest 10, a child seat 1 and two adapter elements 30, 30', wherein in FIG. 1 only one adapter element 30 is visible (the other adapter element 30' is covered by the seat surface element 20). The child seat 1 is constructed mirror-symmetrically relative to a plane which extends through the middle of the floor area 24 of the seat surface element 20.

The backrest 10 serves to support the back of the child, when the child sits/lies in the child seat 1. The child is able to, when it sits/lies in the child seat 1, to lean with its back against the backrest 10. The seat surface element 20 serves to support the buttocks of the child when the child sits/lies in the child seat 1.

The child seat 1 further comprises a retaining element 40. The retaining element 40 serves to safely retain the child in the child seat 1. This means that the retaining element 40 prevents the child from leaving the child seat 1 from the front (i.e. towards the right/top right) in FIG. 1.

The backrest 10 comprises two outer struts 12, 12', which connect the upper end 19 of the backrest 10 (i.e. the distal end of the backrest 10 in relation to the adapter element 30) with the first locking element 50 (via a back rest connecting element 18, 18'). In their upper area directly adjoining the upper end 19 of the backrest 10, the outer struts 12, 12' have a distance/free space to a longitudinal portion 14 of the backrest 10, which extends in the middle of the backrest 10. When the child sits in the child seat 1, the back touches the longitudinal portion 14, i.e. the child is able to lean with its back against the longitudinal portion 14 of the backrest 10.

The longitudinal portion 14 is joined to a lumbar support region 16, which extends over the entire width of the backrest 10. The lumbar support region 16 is located in the region of the loins of the child when the child (as envisaged) sits in the child seat 1. The outer struts 12, 12' transition into the lumbar support region 16/extend through the same. A distance/a free space 13 exists between the lumbar support region 16 and the seat surface element 20. There is, when in use, no support element for the back/the loins of the child in this free space 13 in the middle of the backrest 10 below the longitudinal portion 14. The lumbar support region 16 is connected to the first locking element 50 via two backrest connecting elements 18, 18'. The backrest connecting elements 18, 18' are adjoined below the lumbar support region 16 and connect the same to the first locking element 50/the lower end of the backrest connecting element 18 forms part of the first locking element 50.

The backrest 10 is formed mirror-symmetrically to a mirror plane which extends at right angles to the longitudinal portion 14 and extends from the upper end 19 of the backrest 10 through the middle of the floor area 24 of the seat surface element 20.

At the upper end 19 of the backrest 10 a releasing device is provided for releasing the third locking. The releasing device is, in particular, a releasing handle 15, which (in FIG. 15) can be pulled upwards.

The seat surface element 20 has a shell-like shape. The seat surface element 20 basically comprises a floor area 24 in its middle. The two lateral ends 22, 22' of the seat surface element 20 which are joined laterally to the floor area 24, protrude past the base area/the planar floor area 24 towards the top. When the child (as intended) sits/lies in the child seat 1, the two lateral ends 22, 22' protrude beyond the floor area 24 of the seat surface element 20 such that movement of the buttocks of the child is laterally restricted.

The seat surface element 20 is connected to the first locking element 50. The first locking element 50 is arranged close to the rear end (left in FIG. 2) of the seat surface element 20 and just above the (basically in FIG. 2 horizontally extending) centre line of the seat surface element 20.

The two outer struts 12, 12' as well as the two backrest connecting elements 18, 18' laterally protrude beyond the lateral ends 22, 22' of the seat surface element 20 such that in the collapsed state of the child seat 1, the seat surface element 20 is at least partly received between the outer struts 12, 12'.

The child seat 1 further comprises two adapter elements 30, 30' (wherein only one adapter element 30 is visible in FIG. 1). The adapter elements 30, 30' serve to connect the child seat 1 to a pushchair frame. Thus the child seat 1 can be connected to a pushchair frame via the adapter element 30 or the adapter elements 30, 30'. The child seat 1 may comprise merely one adapter element 30. More than two adapter elements, e.g. three, four, five or six are also conceivable. A higher number of adapter elements makes the connection between child seat 1 and pushchair frame even safer and firmer. It is also conceivable that the connection between child seat 1 and pushchair frame via the adapter element 30/the adapter elements 30, 30' is non-releasable/very difficult to release.

The adapter element 30 consists of two adapter element halves 31, 31'. The two adapter element halves 31, 31' form a cavity in which a projection of the pushchair frame can be received (tongue-and-groove joint). Other kinds of connection are also conceivable.

The adapter element 30, 30' comprises an unlocking button 33, with which the connection between the adapter element 30, 30' and the pushchair frame can be released. The unlocking button 33 can be pressed inwards. It is used to perform the unlocking between adapter element 30, 30' and the pushchair frame.

The connection between the child seat 1 and the pushchair frame is rigid. That means that the child seat cannot be moved either up or down, forward or backward/to the right or the left, as long as the connection between the adapter element 30, 30' and the pushchair frame is locked, snapped in place or latched. After pushing the unlocking button 33, the child seat can be removed from the pushchair frame in an upward direction (i.e. upwardly in FIG. 2), i.e. lifted up.

The backrest 10 is rotatable about a first rotary axis 59, which extends centrally through the first locking element 50. The first rotary axis 59 extends through the centre 110 of the first locking element 50 and in FIG. 2 extends at right angles to the paper plane.

The seat surface element 20 is equally rotatable about the first rotary axis 59.

The retaining element 40 is rotatable about a second rotary axis 69, which extends through the centre 120 of the second locking element 60. The second rotary axis 69 also extends at right angles to the paper plane in FIG. 2.

The first rotary axis 59 and the second rotary axis 69 are not identical. The first rotary axis 59 and the second rotary axis 69 extend in parallel to each other. It is also conceivable, however, for the first rotary axis 59 and the second rotary axis 69 to be identical. It is therefore conceivable that the retaining element 40 is rotatable about the same axis as the backrest 10 and the adapter element 30. Equally it is conceivable that the first rotary axis 59 and the second rotary axis 69 are not identical and do not extend in parallel to each other. In particular the first rotary axis 59 and the second rotary axis 69 could be askew relative to each other.

In FIG. 1 the child seat 1 is shown in the folded-out state. Here the seat surface element 20 is locked in relation to the one adapter element 30 or adapter elements 30, 30'. This means that the seat surface element 20 is not rotatable about the first rotary axis 59. The seat surface element 20 is therefore fixed in relation to the one or adapter elements 30, 30'. In the locked position the angle between the seat surface element 20 and the adapter elements 30, 30' can therefore not be altered, in particular not reduced. This means that the seat surface element 20 is not rotatable clockwise (and also not anti-clockwise) about the first rotary axis 59 in direction of the adapter elements 30, 30'.

In the locked state which is shown in FIG. 1, the backrest 10 is also locked, i.e. latched, in relation to the seat surface element 20. The backrest 10 is also locked, i.e. latched, in relation to the adapter element/adapter elements 30, 30'. In the locked position the backrest 10 is also not rotatable about the first rotary axis 59, and the angle between the backrest 10 and the seat surface element 20 cannot be altered in the locked or latched position of the backrest 10, i.e. when the third locking is fixed in position. In FIG. 1 therefore, the angle between the backrest 10 and the seat surface element 20 as well as the angle between the backrest 10 and the adapter element 30 cannot be altered.

The angle between the backrest 10 and the seat surface element 20 is understood to be the angle between a plane, which extends along the longitudinal portion 14 of the backrest 10 starting from the upper end of the backrest 10, and a plane, which is formed by the planar floor area 24 of the seat surface element 20.

The angle between the adapter element 30, 30' and the backrest 10 is the angle between a plane, which extends through the centre 110 of the first locking element 50 and extends (in FIG. 2) basically downwards along the adapter element 30, and the plane, which is formed by the longitudinal portion 14 of the backrest 10/extends along the backrest 10.

Further the child seat 1 comprises a retaining element 40. In the released state, i.e. in the unlocked state, the retaining element 40 is rotatable about a second rotary axis 69. In FIG. 1 the retaining element 40 is shown in the locked position, i.e. the second locking is fixed. In the locked state the retaining element 40 cannot rotate about the second rotary axis 69. The second rotary axis 69 is offset in parallel to the first rotary axis 59. The second rotary axis 69 is located roughly in the middle of the length (running from left to right in FIG. 2) of the seat surface element 20. The second rotary axis 69 is located in the plane/at the level of the floor area 24 of the seat surface element 20. Therefore the second rotary axis 69 (in the folded-out state of the child seat in FIG. 1) is further apart from the backrest 10 than the first rotary axis 59.

Figure 2:
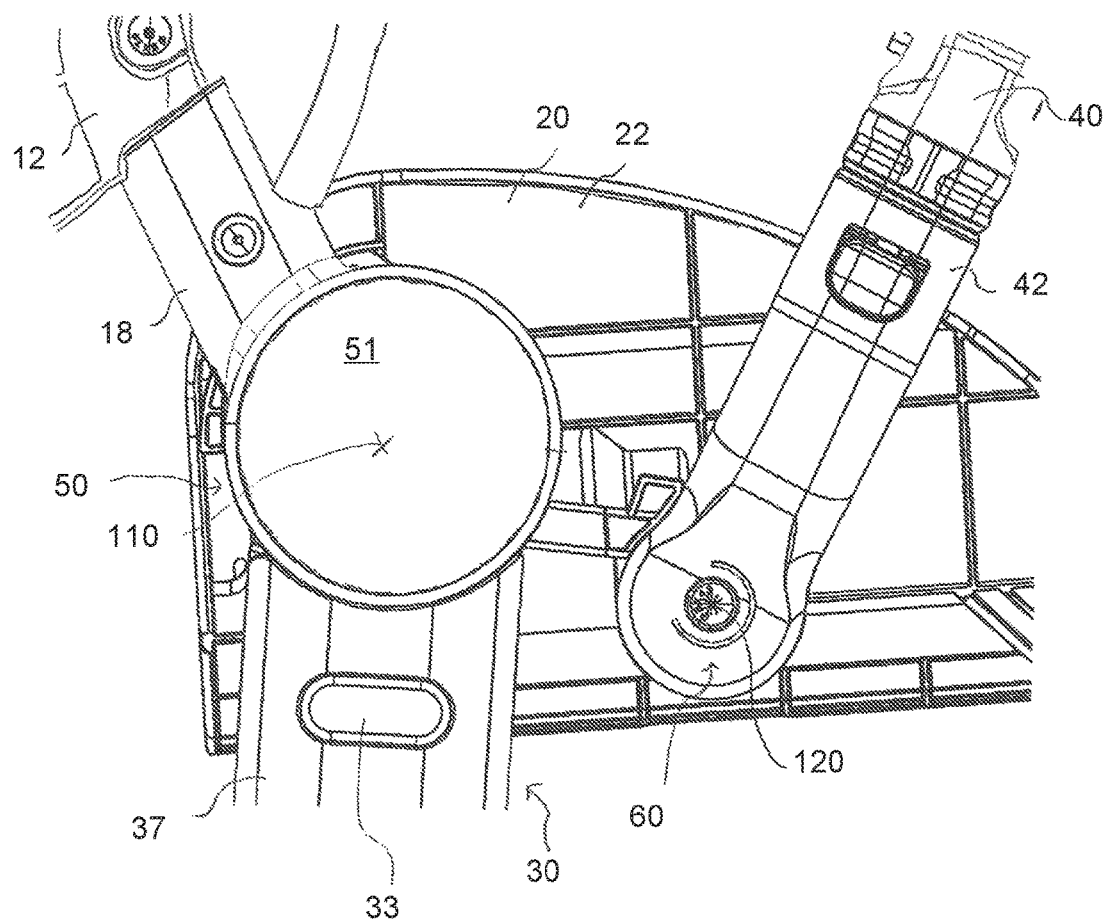
FIG. 2 shows a top view onto a cut-out of the child seat from FIG. 1.
Figure 3:
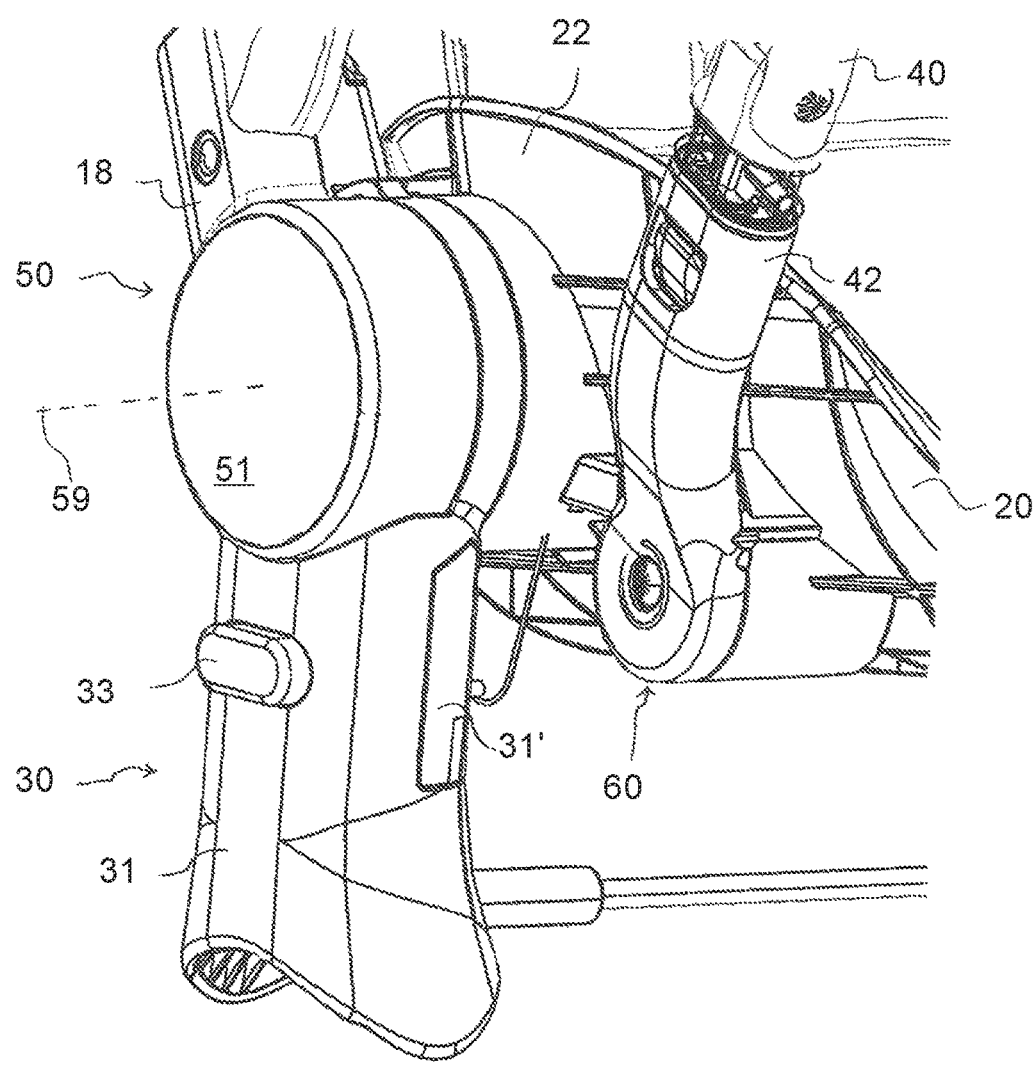
FIG. 3 shows a perspective view of the cut-out shown in FIG. 2.

FIG. 2 shows a (lateral) top view of a cut-out of the child seat 1, i.e. in particular the first locking element 50 and the second locking element 60. FIG. 3 shows a perspective view of the essentially identical cut-out in FIG. 2.

The first locking element 50 comprises a first cover 51. The first cover 51 is a plastic/synthetic element, which protects the mechanism of the first locking element 50 against the ingress of dust, moisture etc. and optically terminates the first locking element 50 towards the outside. A metal alloy or metal as material or part of the material of the first cover 51 is also conceivable.

Figure 4:
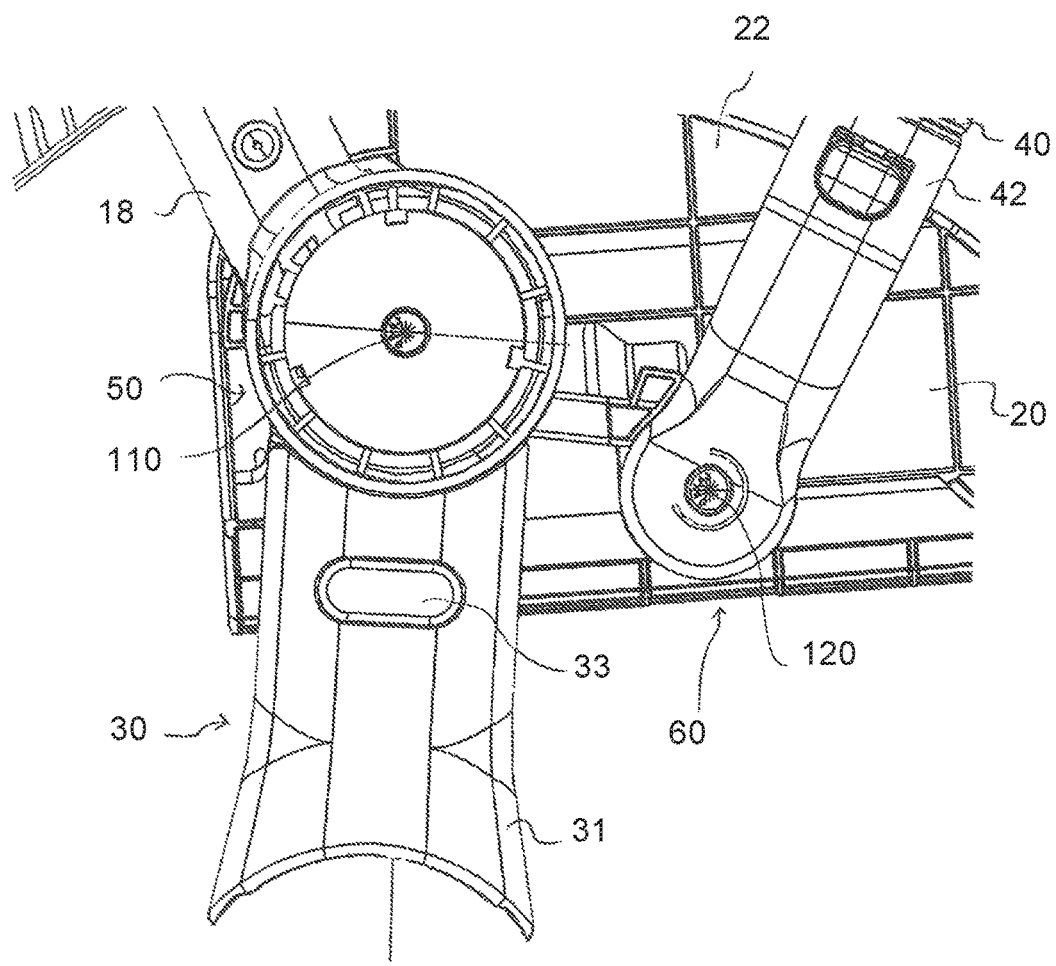
FIG. 4 shows a further top view of the cut-out shown in FIG. 2, wherein the first cover was removed.
Figure 5:
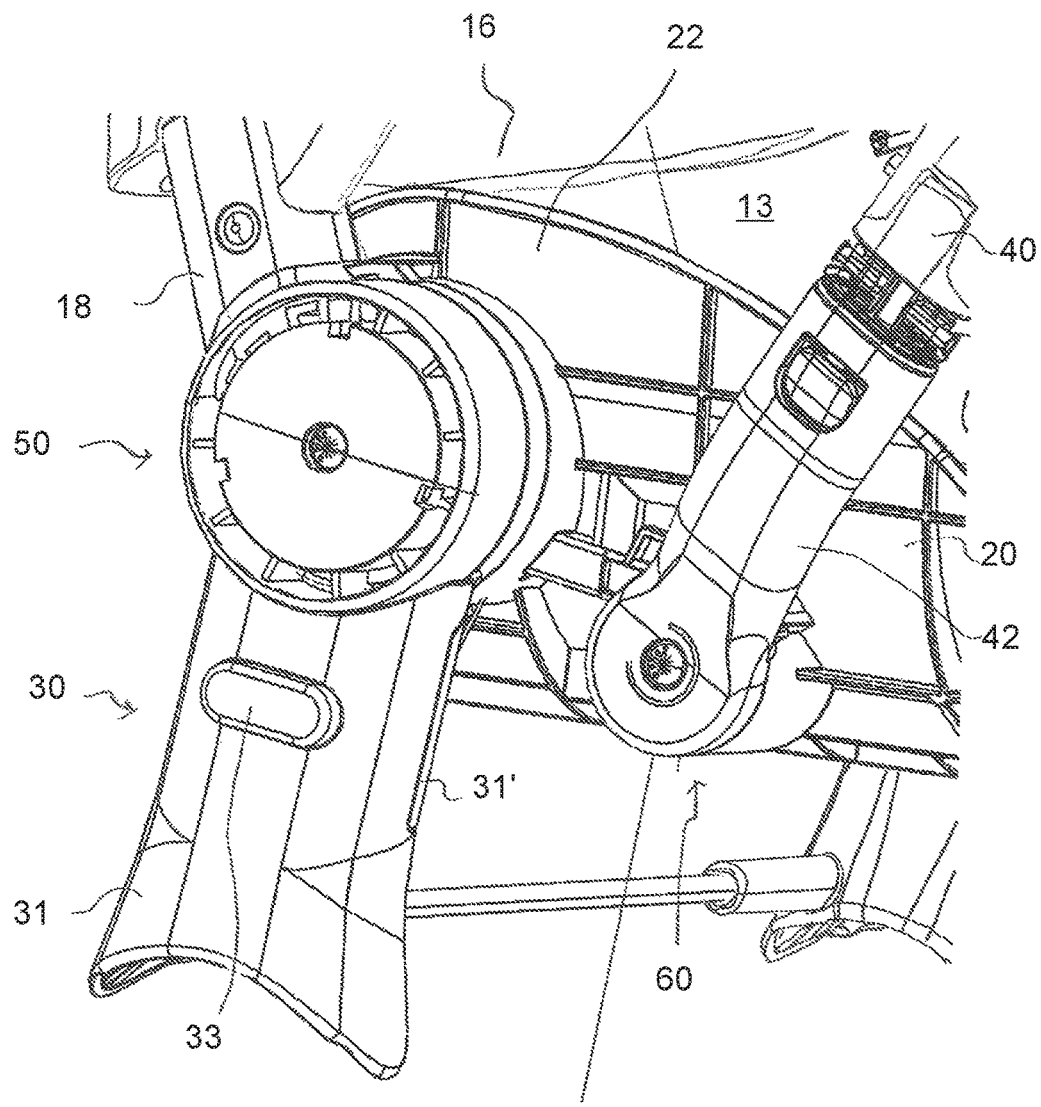
FIG. 5 shows a perspective view of the cut-out shown in FIG. 4.

FIG. 4 shows a further top view of the cut-out shown in FIG. 2, wherein the first cover 51 has been removed. FIG. 5 shows essentially the same cut-out as FIG. 4 in a perspective view.

FIG. 4 and FIG. 5 therefore show a top view/perspective view of the front of the backrest connecting element 18. FIG. 18 and FIG. 19 show a top view and a perspective view of the rear of the backrest connecting element 18, opposite to the front.

The retaining element 40 comprises two retaining element struts 42, 42', via which the retaining element is respectively connected to the second locking device 60.

Figure 6:
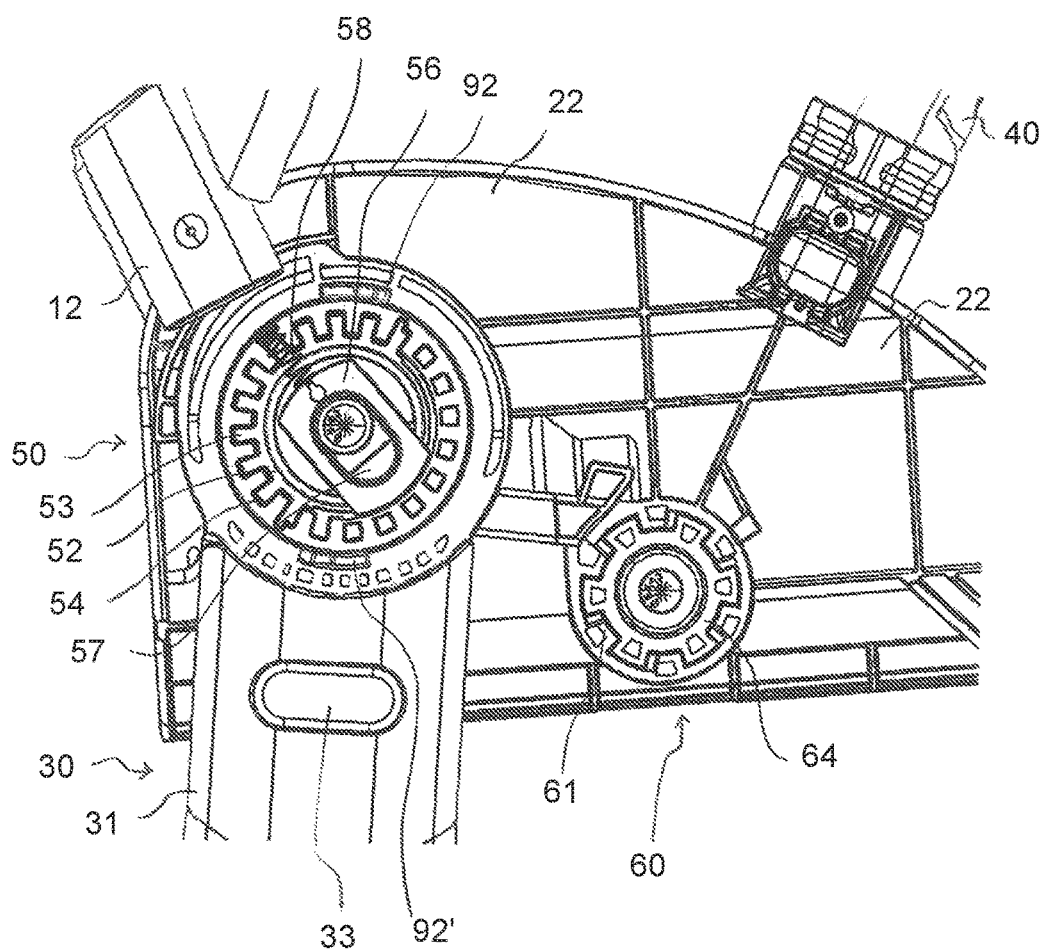
FIG. 6 shows a further top view of the cut-out shown in FIGS. 2 and 4, wherein the backrest connecting element and the retaining element strut were removed.
Figure 7:
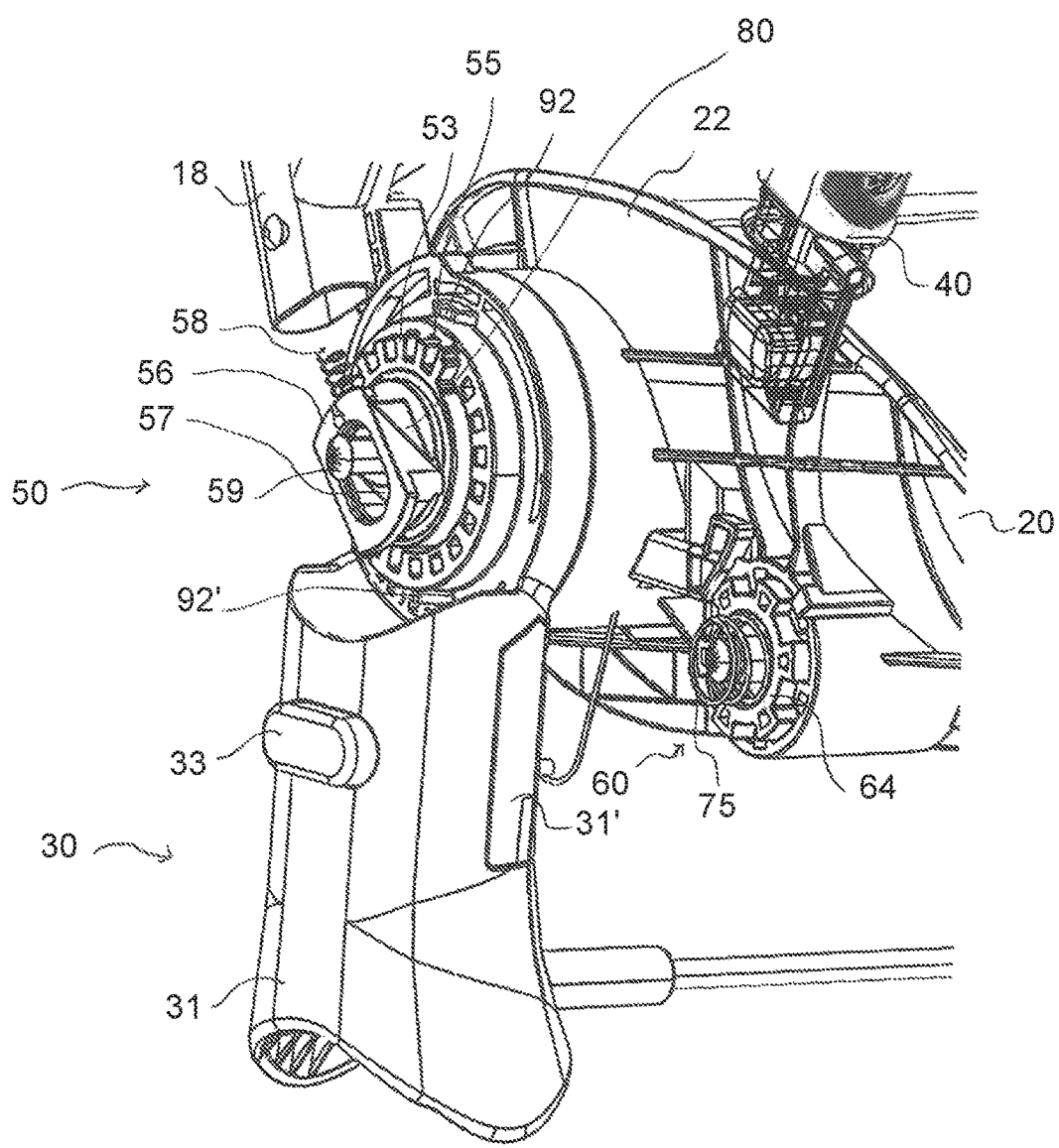
FIG. 7 shows a perspective view of the cut-out shown in FIG. 6.

FIG. 6 shows a further top view of the cut-out shown in FIGS. 2 and 4, wherein the backrest connecting element 18 and the retaining element struts 42 have been removed. FIG. 7 shows a perspective view of the cut-out of FIG. 6.

The first locking element 50 comprises a third gearwheel 52. The third gearwheel 52 has 11 (equidistant) gearwheel teeth 53. The gearwheel teeth 53 in total extend over an angle of approx. 180 degrees. The two outermost opposing gearwheel teeth 53 comprise a step form. The step form of the two outermost gearwheel teeth 53 is mirror-symmetrical in relation to the first rotary axis 59. The other (nine) gearwheel teeth 53 are rectangular shaped.

The adapter element 30 comprises a third internal gearing 54. The third internal gearing 54 comprises a number of grooves. The gearwheel teeth 53 of the third gearwheel 52 engage in the groove 55 of the third internal gearing 54, when the backrest 10 is in the locked position.

In the latched position of the backrest (third locking) the third gearwheel 52 additionally engages in the fourth internal gearing 130 of the backrest connecting element 18 of the backrest 10 (see FIG. 18 and FIG. 19). The fourth internal gearing 130 comprises 14 grooves. These grooves extend over an angle of approx. 270 degrees. The four respectively outermost grooves of the fourth internal gearing 130 have a step form, which is complementary to the two outermost gearwheel teeth 53 of the third gearwheel 52. The six grooves between the respectively outermost grooves of the fourth internal gearing 130 comprise a rectangular form. Thus the third gearwheel 52, in exactly four positions can engage with the second internal gearing 61 of the second locking element 60. In these four positions the backrest 10 (or the backrest connecting element 18 of the backrest 10) is thus locked in relation to the adapter element 30.

The first locking element 50 comprises a pull element 56. The pull element 56 has a recess 57, which extends through the first rotary axis 59. The recess 57 is oval-shaped. In the lateral view, i.e. in a view at right angles to the top view of FIG. 6, the pull element 56 is triangular in shape (this is clearly shown in FIG. 7). The pull element 56 is connected via a third compression spring 58 to a cable pull/Bowden cable (not shown). Via this cable pull the pull element 56 is connected to the releasing device/the releasing handle 15 at the upper end 19 of the backrest 10. The third compression spring 58 retains the pull element 56 in the position shown in FIG. 6 and FIG. 7. By operating the releasing handle 15 the pull element 56 is moved such that the third compression spring 58 is compressed and the pull element 56 is moved (from bottom right to top left in FIG. 6) relative to the third gearwheel 52.

This has the effect that the triangular-shaped pull element 56 presses against the projection 81 (see FIG. 8 and FIG. 9) on the one side and against the backrest connecting element 18 on the other side opposite the first side. Since the backrest connecting element 18/the backrest 10 cannot move outwards (out of the paper plane in FIG. 2) because the backrest connecting element 18 is fixedly connected via the first rotary axis 59 (in axial direction of the first rotary axis 59) to the seat surface element 20, the third gearwheel 52 is pressed inwards, i.e. in direction of the seat surface element 20 (into the paper plane in FIG. 6).

In the locked/latched position which is shown in FIGS. 6-11, albeit without the backrest connecting element 18 naturally required for the third locking, the third gearwheel 52 is in such a position that its gearwheel teeth 53 are partially in engagement with the fourth internal gearing 130 and partially in engagement with the third internal gearing 54. In particular approximately half of each gearwheel tooth 53 is in engagement with the one internal gearing 130 and the other half is in engagement with the other internal gearing 54.

By operating the releasing handle 15 the pull element 56 is moved which in turn acts on the third gearwheel 52 such that this is pressed and moved inwards (in direction of the seat surface element 20 along the first rotary axis 59). As a result the gearwheel teeth 53 of the third gearwheel 52 move out of the internal gearing 61, and the third gearwheel 52 engages completely into the third internal gearing 54. This means that no part of the third gearwheel 52, in particular not the gearwheel teeth 53, protrudes outwards (i.e. away from the seat surface element 20, out of the paper plane in FIG. 5). Thus the backrest 10 is now rotatable about the first rotary axis 59 in relation to the adapter element 30.

Figure 8:
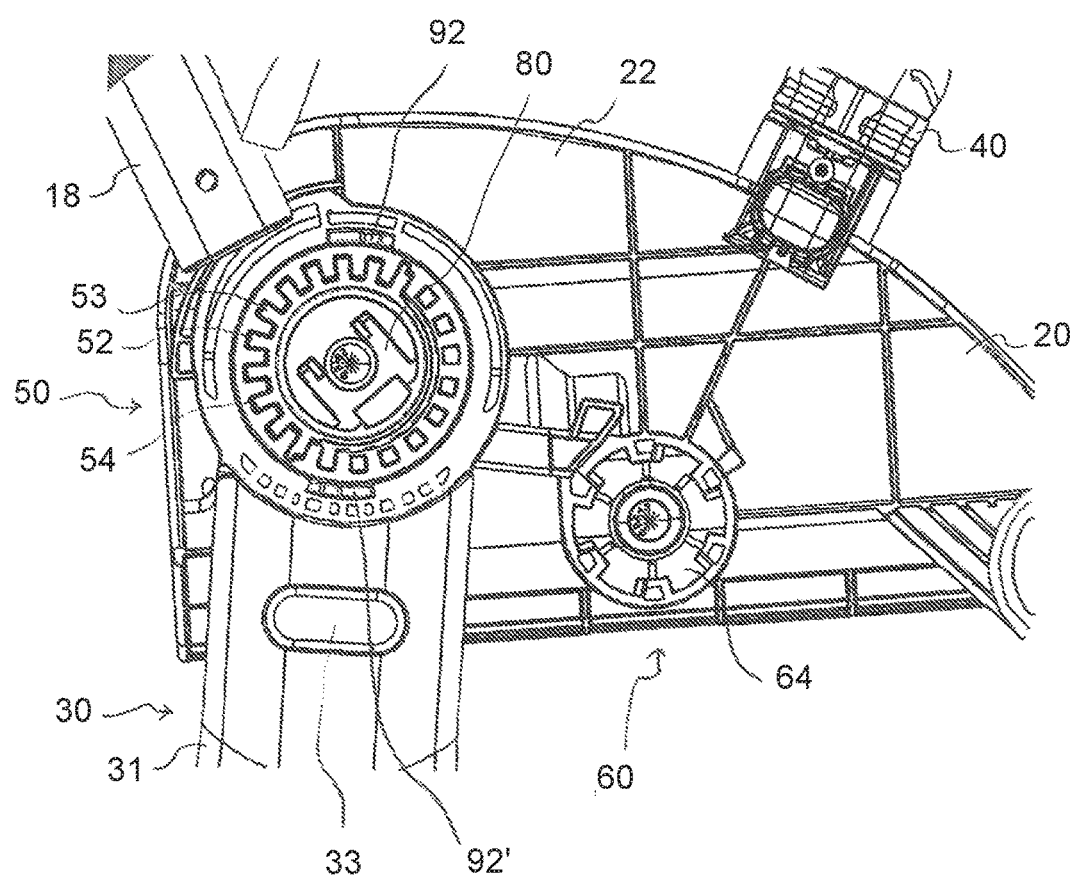
FIG. 8 shows a further top view of the cut-out shown in FIGS. 2, 4 and 6, wherein the pull element and the third compression spring were removed.
Figure 10:
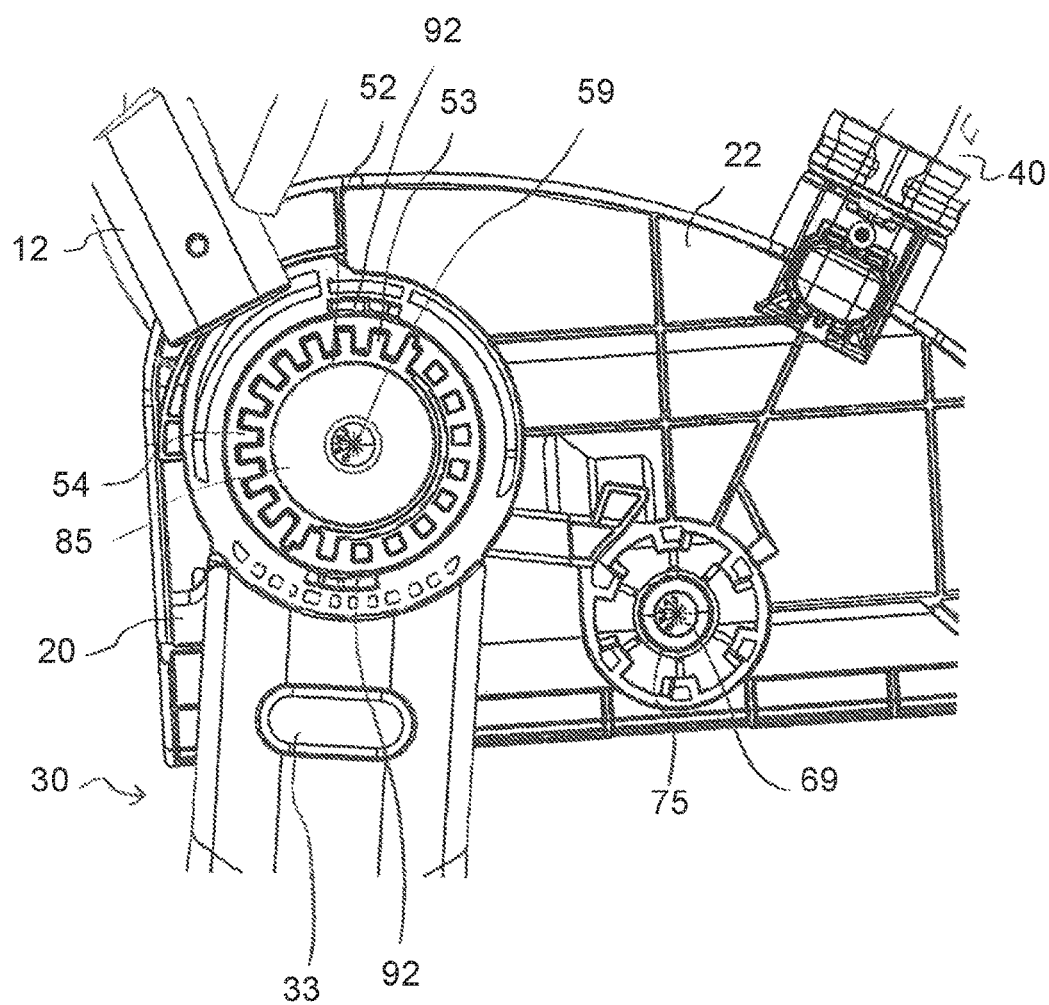
FIG. 10 shows a further top view of the cut-out shown in FIGS. 2, 4, 6 and 8, wherein the projection and the second gearwheel were removed.
Figure 11:
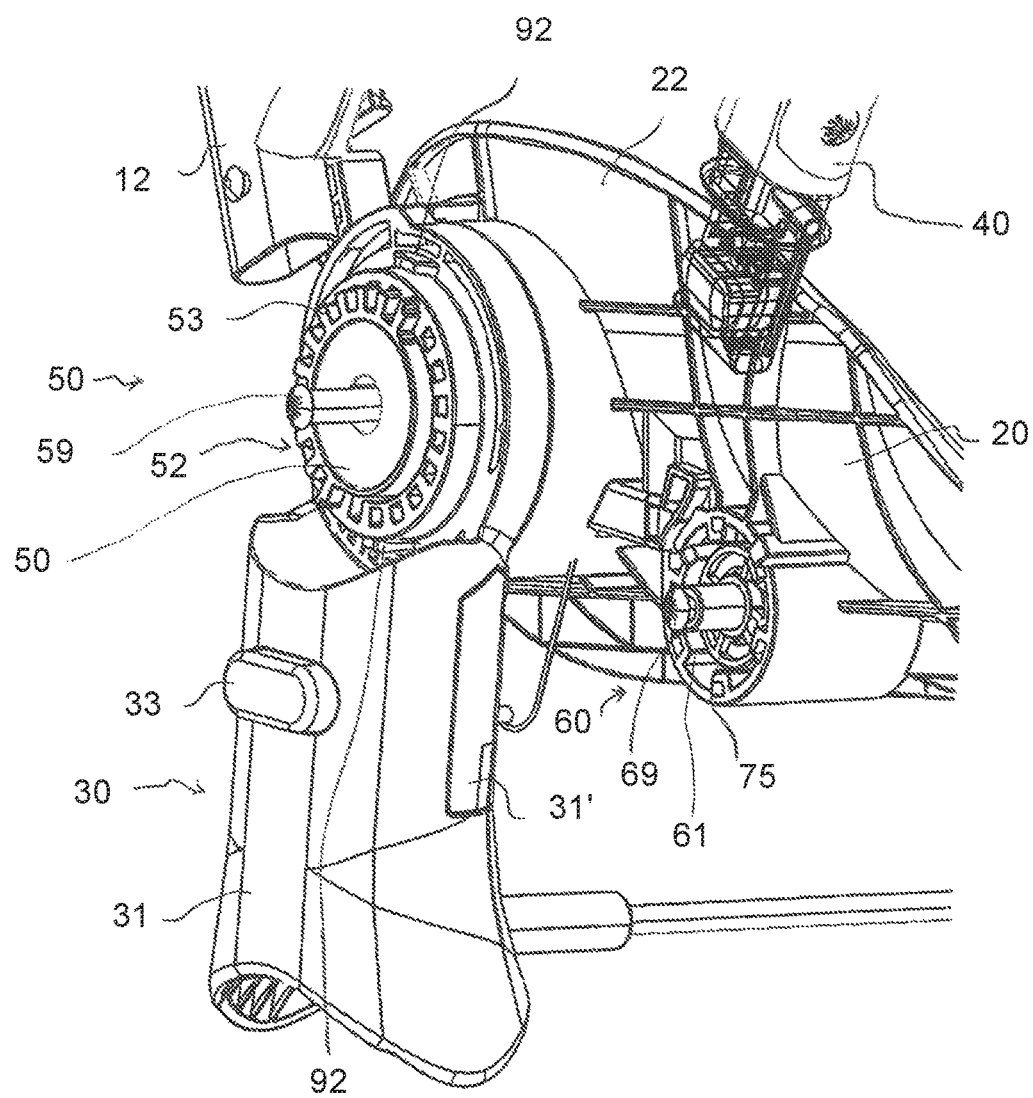
FIG. 11 shows a perspective view of the cut-out shown in FIG. 10.

On the rear side of the third gearwheel 52 not shown in FIG. 10, a further spring is arranged which ensures that the third gearwheel 52 is acted upon by a force, which presses the third gearwheel 52 outwards (out of the paper plane in FIG. 6, in FIG. 8 and in FIG. 10). After letting go of the releasing handle 15 the third compression spring 58 presses the pull element 56 back into the position shown in FIG. 6. Therefore there is no inward pressure or force acting on the third gearwheel 52, so that due to the spring (not shown in FIG. 6) on the rear side of the third gearwheel 52, the third gearwheel 52 is again pressed outwards, so that it partially engages again with the second internal gearing 61. After letting go of the releasing handle 15 the third gearwheel 52 reaches again its locked position so that the backrest 10 is locked (third locking) in relation to the locking element 30.

FIG. 6 shows two thrust ring projections 92, 92' of the thrust ring 90. The two thrust ring projections 92, 92' lie opposite each other relative to the first rotary axis 59. The two thrust ring projections 92, 92' are partially located in recesses of the outer adapter element half 31 and engage right through the recesses, wherein the recesses are directly joined to the outer circumference of the third gearwheel 52.

Figure 9:
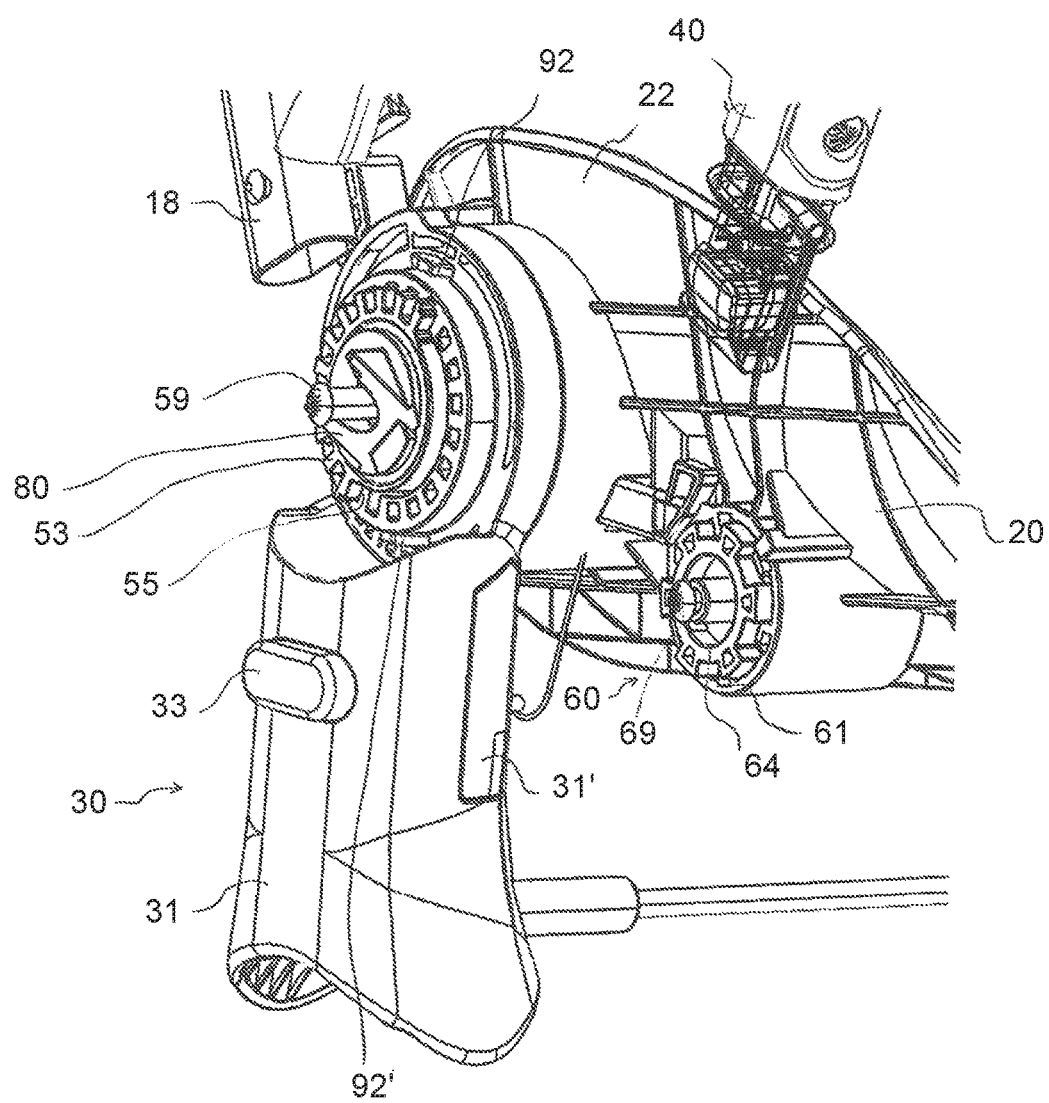
FIG. 9 shows a perspective view of the cut-out shown in FIG. 8.

In FIG. 8 a further "layer" has been removed in relation to the view of FIG. 4. That is, the third compression spring 58 as well as the pull element 56 have been removed. In the central area of the third gearwheel 52 an oblique element 80 with a projection 81 is formed. This projection 81 together with the pull element 56 has the effect that the third gearwheel 52 is pressed inwards when the pulling handle 15 is operated. FIG. 9 shows a perspective view of the cut-out of FIG. 8.

In FIG. 10 the oblique element 80 has been removed and a further "layer" of the first locking element 50 is exposed. In the inner area (the area between the gearwheel teeth 53 and the first rotary axis 59) there is a gliding surface 85, which is disc-shaped. The oblique element 80 can glide over this gliding surface 85 and thus the third gearwheel 52 can rotate relative to the oblique element 80/the oblique element can rotate relative to the third gearwheel 52 about the first rotary axis 59.

Figure 12:
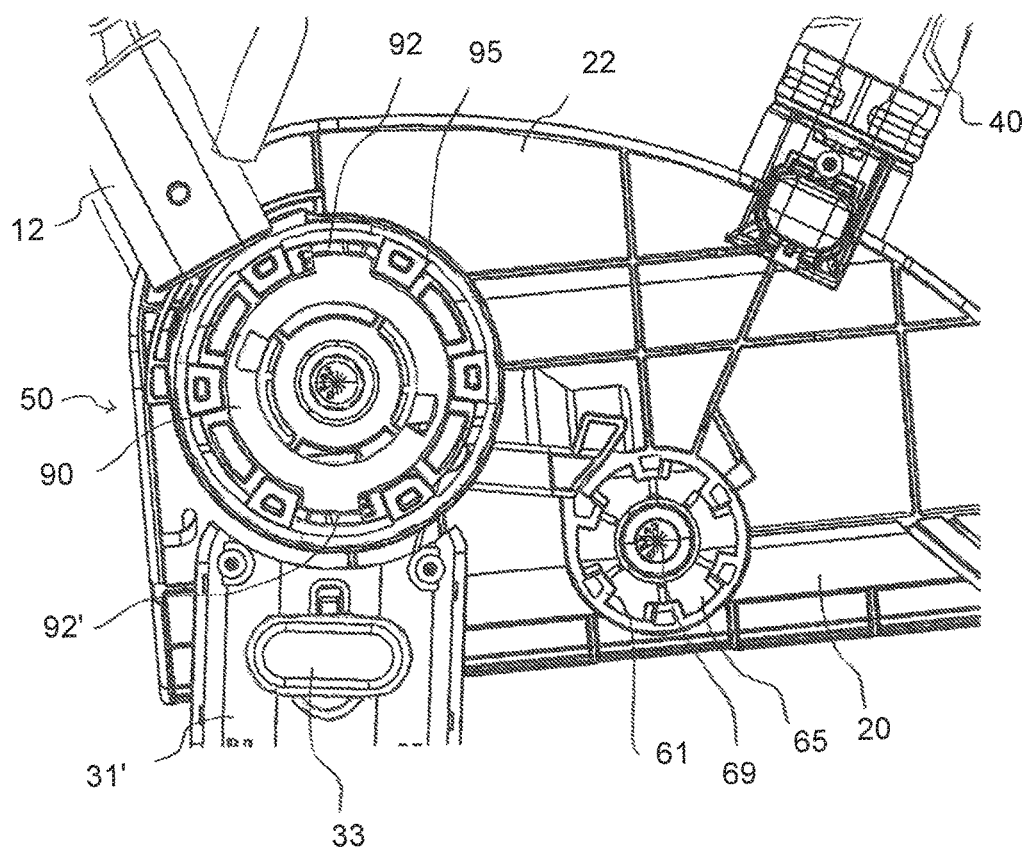
FIG. 12 shows a further top view of the cut-out shown in FIGS. 2, 4, 6, 8 and 10, wherein the outer adapter element half and the third gearwheel were removed.
Figure 13:
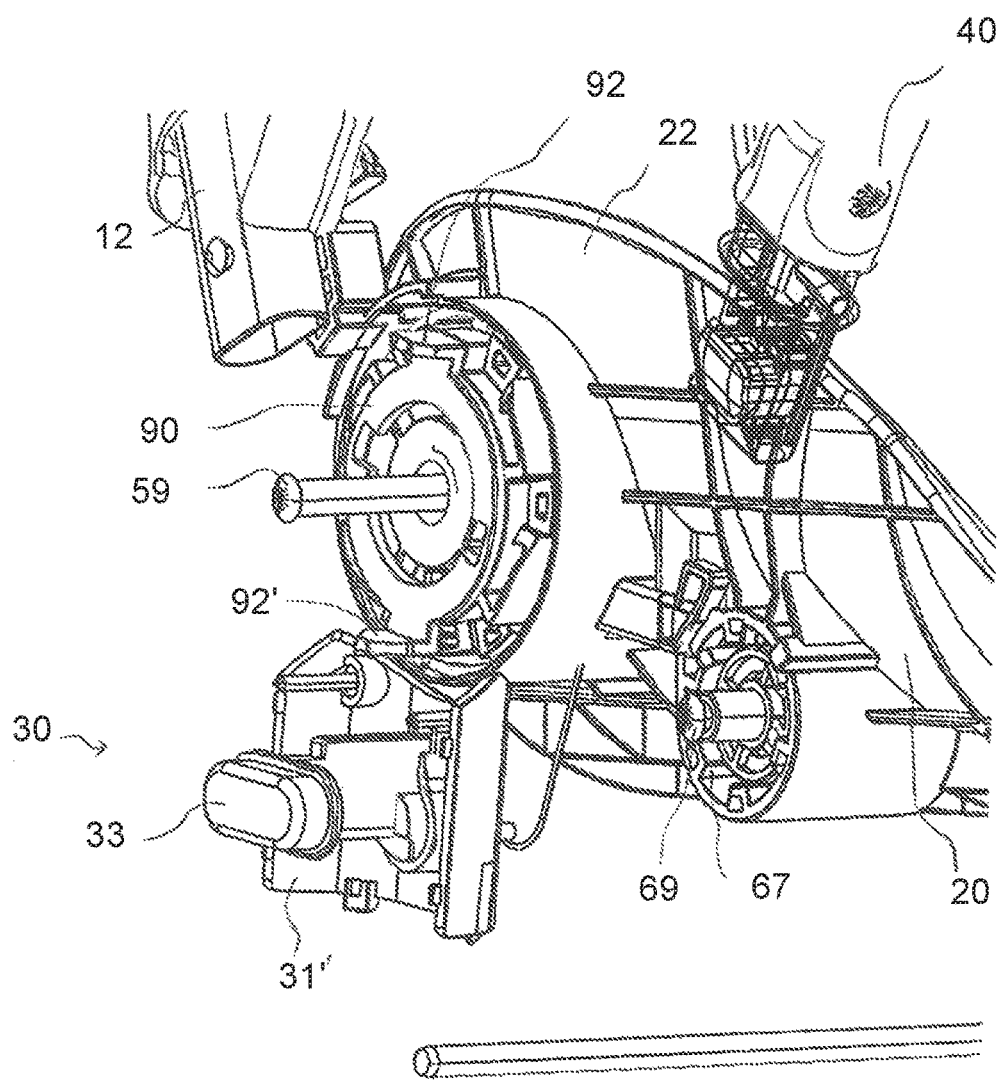
FIG. 13 shows a perspective view of the cut-out shown in FIG. 12.

FIG. 12 shows a further top view of the cut-out shown in FIGS. 2, 4, 6, 8 and 10, wherein part of the first adapter element 30, i.e. the outer adapter element half 31, and the third gearwheel 52 have been removed. FIG. 13 shows a perspective view of the cut-out from FIG. 12.

In FIGS. 12 and 13 an essentially disc-shaped thrust ring 90, which is arranged/mounted non-rotatably about the first rotary axis 59 relative to the outer adapter element half 31 can be clearly recognised. The thrust ring is rigid/fixed, i.e. non-rotatable relative to the first gearwheel 95.

On two sides of the thrust ring 90, which lie opposite each other relative to the first rotary axis 59, two thrust ring projections 92, 92' are formed which point away from the seat surface element 20 (out of the paper plane in FIG. 12). These protrude through openings/recesses of the adapter element 30/the outer adapter element half 31 (previously removed in FIG. 12).

As the backrest 10 rotates about the first rotary axis 59 in relation to the seat surface element 20, the two thrust ring projections 92, 92' begin to make contact with two opposing projections 63, 63' of the backrest connecting element 18 (see FIG. 18 and FIG. 19). The projections 63, 63' slowly rise in circumferential direction of the lower circular end of the backrest connecting element 18. As the angle between the backrest 10 and the seat surface element 20 decreases, the projections 63, 63' come into contact with the two thrust ring projections 92, 92'. The thrust ring projections 92, 92' glide/get onto the projections 63, 63', which in circumferential direction of the lower circular end of the backrest connecting element 18 protrude continually more. As the angle between backrest 10 and seat surface element 20 decreases, the projections 63, 63' steadily increase their pressure against the thrust ring projections 92, 92' or, in other words, the thrust ring projections 92, 92' steadily increase their pressure against the projections 63, 63'.

Thus due to the backrest 10 rotating about the first rotary axis 59 and thereby due to the projections 63, 63' rotating about the first rotary axis 59, pressure is exerted via the thrust ring projections 92, 92' onto the thrust ring 90, so that the thrust ring 90 is pressed inwards, i.e. in direction of the seat surface element 20 (into the paper plane in FIG. 12).

Figure 14:
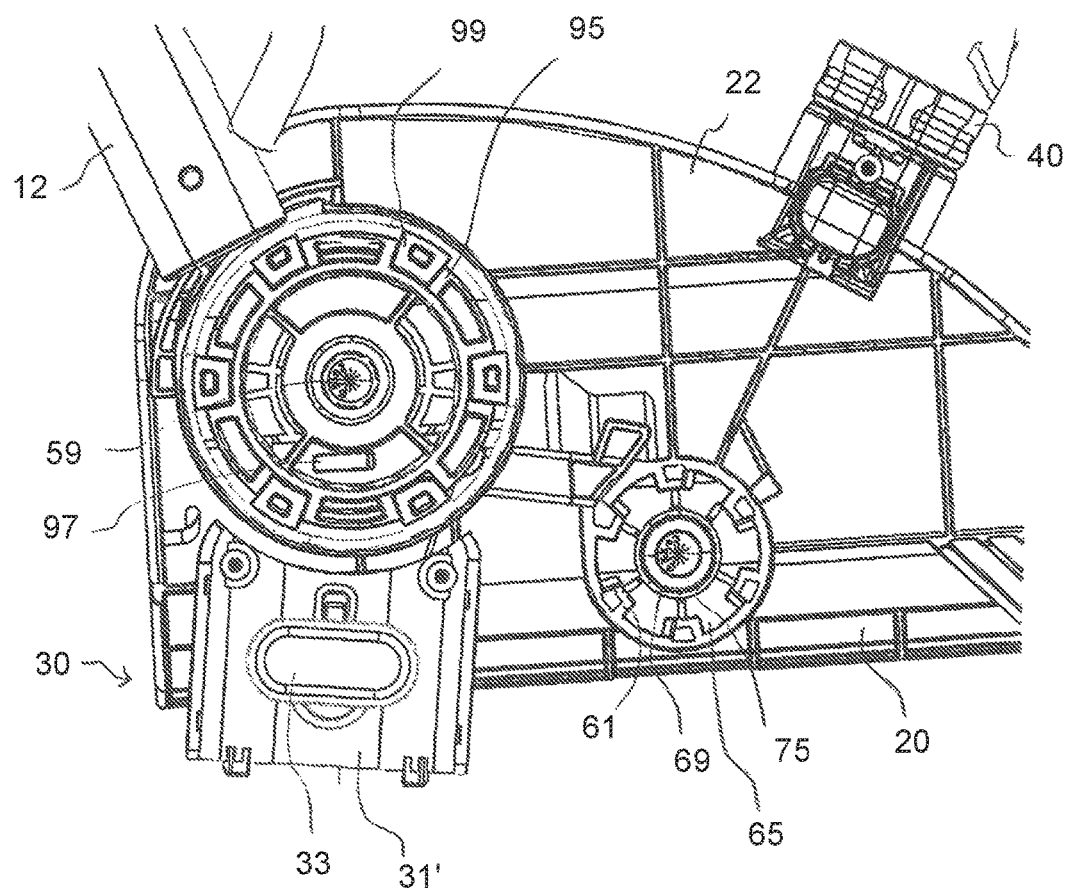
FIG. 14 shows a further top view of the cut-out shown in FIGS. 2, 4, 6, 8, 10 and 12, wherein the thrust ring was removed.

The thrust ring 90 rides on the first gearwheel 95. In FIG. 14 the thrust ring 90 is removed, so that the first gearwheel 95 can be clearly recognised. The first gearwheel 95 is with its teeth in partial engagement with the adapter element 30. Due to the pressure of the thrust ring 90 being directed inwards the first gearwheel 95 is pressed inwards against a spring (not shown), i.e. in direction of the seat surface element 20 (into the paper plane in FIG. 12 and FIG. 14). Thus the first gearwheel 95 disengages from the first internal gearing 99 of the adapter element 30/the outer adapter element half 31. Thus the adapter element 30/the outer adapter element half 31, comprises an internal gearing 99, 54 on both sides, i.e. on the side facing the first cover 51 and on the side facing the seat surface element 20, respectively.

After the first gearwheel 95 has disengaged from the adapter element 30/the outer adapter element half 31, the seat surface element 20 can be rotated about the first rotary axis 59. The seat surface element 20 has thus reached a release position. In this release position the angle between the seat surface element 20 and the adapter element 30 can be reduced. The seat surface element 20 can now be folded and moved downwards.

Figure 15:
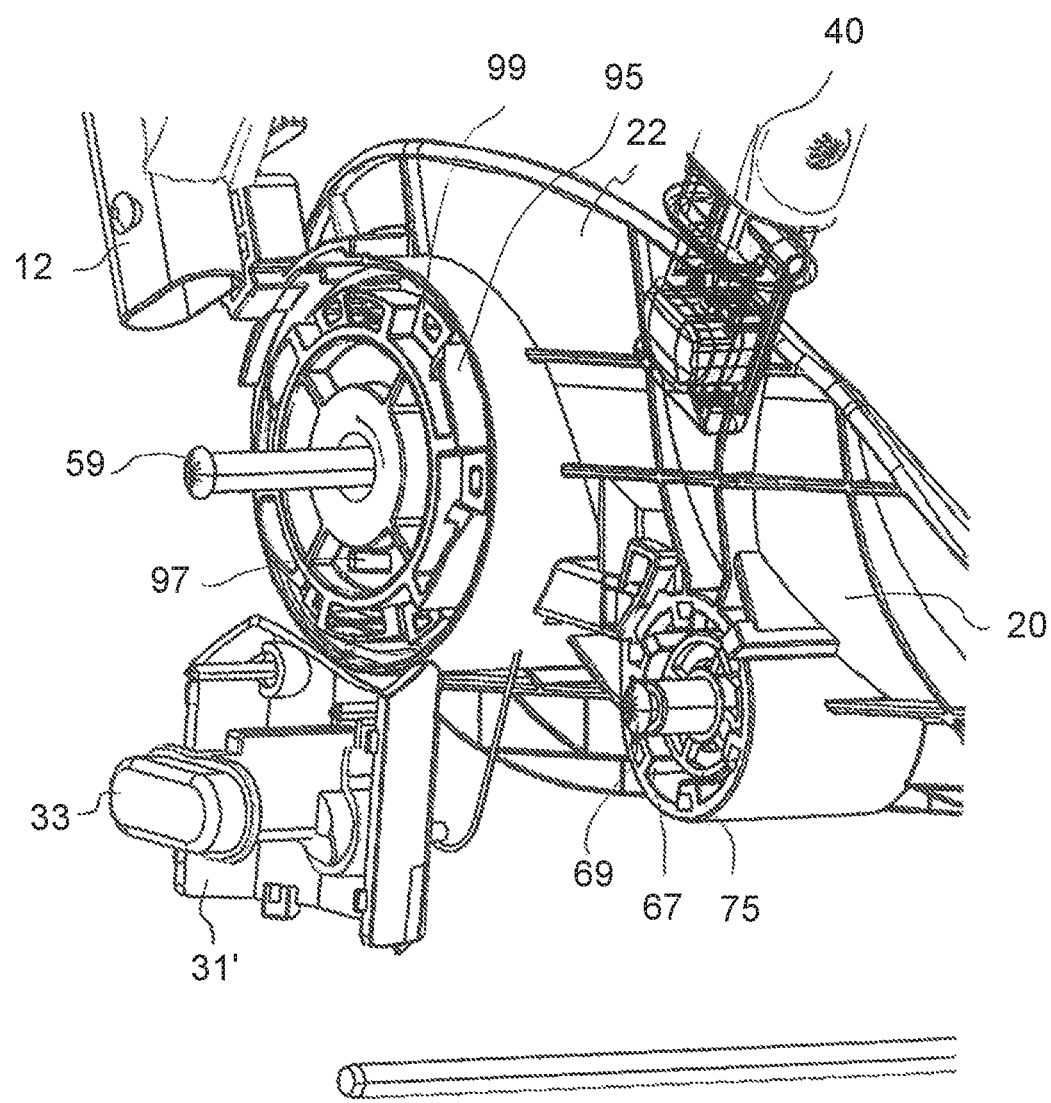
FIG. 15 shows a perspective view of the cut-out shown in FIG. 14.

FIG. 14 shows a further top view of the cut-out shown in FIGS. 2, 4, 6, 8, 10 and 12, wherein the thrust ring 90 has been removed. FIG. 15 shows a perspective view of the cut-out in FIG. 14.

Figure 16:
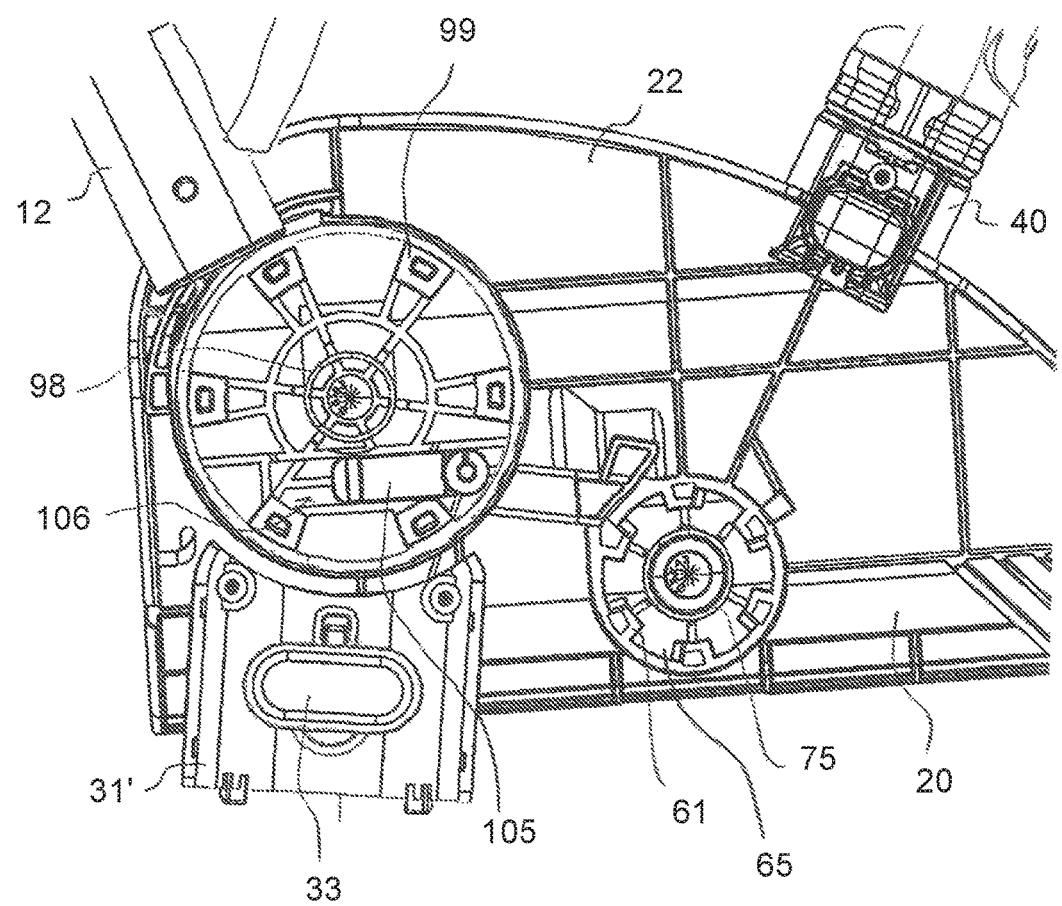
FIG. 16 shows a further top view of the cut-out shown in FIGS. 2, 4, 6, 8, 10, 12 and 14, wherein the first gearwheel was removed.

FIG. 16 shows a further to view of the cut-out shown in FIGS. 2, 4, 6, 8, 10, 12 and 14, wherein the first gearwheel 95 has been removed. FIG. 17 shows a perspective view of the cut-out in FIG. 16.

In FIG. 16 the first gearwheel 95 has been removed. In FIG. 17 the first compression spring is visible, which presses against the first gearwheel 95, pressing it outwards (out of the paper plane in FIG. 16, i.e. away from the seat surface element 20).

The first gearwheel 95 comprises an oblique projection 97. The oblique projection 97 points in direction of the seat surface element 20 in FIG. 14, i.e. in FIG. 14 it is located on the rear side of the first gearwheel 95. By rotating the backrest 10 clockwise in FIG. 2/FIG. 14, the second pull element 105 is moved (to the left in FIG. 14) via the projection 97. The second pull element 105 moves a cable pull/Bowden cable, which connects the second pull element 105 to the second locking element 60. By pulling on the cable pull/the Bowden cable (not shown), the second gearwheel 64 is moved inwards (in direction of the seat surface element 20, thereby releasing the second locking (between retaining element 40 and seat surface element 20).

The first locking element 50 comprises the second pull element 105, which is movable in a pull element recess 106. The pull element recess 106 in FIG. 16 extends at an angle of approx. 5° to 10° to the horizontal towards the top right. A further second cable pull (not shown) operates the second pull element 105 and this cable pull moves the second locking element 60 from a locked position into a release position (this corresponds to the second locking).

During rotation of the backrest 10 (clockwise in FIG. 2) the thrust ring projections 92, 92' come into contact with the projections 63, 63' of the outer adapter element half 31 (see also FIG. 18 and FIG. 19). The thrust ring projections 92, 92' press against the projections 63, 63' (slowly rising in circumferential direction). The effect of this is that the thrust ring 90 is pressed inwards (into the paper plane in FIG. 16). The thrust ring in turn presses and moves the first gearwheel 92 inwards (in direction of the seat surface element 20) against the first compression spring 98. At the same time the oblique projection 97 of the first gearwheel 92 presses against the second pull element 105 and moves it away from the second locking element 60 (towards the left in FIG. 16). The second locking element, in particular the second gearwheel 64, is operated via the second cable pull/the Bowden cable, which is connected to the second pull element 105, and is brought out of engagement with the internal gearing of the retaining element strut 42.

The second locking element 60 comprises a second gearwheel 64, which is in engagement with the grooves 65 of the seat surface element 20. When the second cable pull is operated (i.e. by pressing the first gearwheel 52 inwards and thus causing the second pull element 105 to move away from the second locking element 60), the second gearwheel 64 is pressed against a second compression spring 75 such that the second gearwheel 64 is pressed and moved in direction of the seat surface element 20 along the second rotary axis 69. As a result the second gearwheel 64 is brought out of engagement with the internal gearing of the retaining element strut 42, 42', in that the second gearwheel 64 is moved completely into the second internal gearing 61 of the seat surface element 20. After the second gearwheel 64 has been brought out of engagement with the retaining element strut 42/the retaining element 40 in this way, the retaining element 40 is then rotatable about the second rotary axis 69 (in relation to the seat surface element 20).

In the latched position of the retaining element 40 (second locking) the second gearwheel 64 is in partial engagement with the second internal gearing 61 of the seat surface element 20 and in partial engagement with the internal gearing of the retaining element 40/the retaining element strut 42. In particular roughly half of the second gearwheel 64 is in engagement with the one internal gearing 61 of the seat surface element 20 and the other half is in engagement with the other internal gearing of the retaining element 40/the retaining element strut 42.

During rotation of the backrest 10 about the first rotary axis 59 and reduction of the angle between the backrest 10 and the seat surface element 20 (movement of the backrest 20 towards the seat surface element 20, in FIG. 2 in clockwise direction), locking of the retaining element 40 is cancelled/undone (second locking). By further reducing the angle between the backrest 10 and the adapter element 30 (in clockwise direction in FIGS. 2 to 19)/in relation to the retaining element 40, the locking of the seat surface element 20 in relation to the adapter element 30 is also subsequently cancelled (first locking).

Thus, after operating the releasing device/the releasing handle 15 and moving the backrest 10 clockwise, the retaining element 40 and the seat surface element 20 can be released and folded down, thereby reducing the angle between these and the adapter element 30. The outer dimensions of the collapsed child seat 1 are thereby reduced. The child seat can now be stowed away in a simple and space-saving manner.

The retaining element 40 has a snap-in position, in which the retaining element 40 locks during folding-out of the child seat 1. This snap-in position/locked position is shown in FIG. 1.

The seat surface element 20 has a snap-in position, in which the seat surface element 20 snaps in. This snap-in position/locked position is shown in FIG. 1 and FIGS. 2-19.

In the orientation shown in FIG. 1 all three lockings (first locking, second locking, third locking) are fixed in position, which means that the backrest 10, the seat surface element 20, the retaining element 40 and the adapter element/adapter elements 30, 30' cannot move against each other. This means that the angle between the said elements and thus the distance of the ends distal to the first locking element 50, of the elements to each other cannot be altered.

With all three lockings one gearwheel 95, 64, 52, respectively, is in engagement with respectively two internal gearings (an outer internal gearing and an inner internal gearing, respectively). To release the respective locking, the respective gearwheel 95, 64, 52 is moved inwards (into the paper plane in FIGS. 2, 4, 6, 8, 10, 12, 14 and 16, i.e. towards the seat surface element 20) against a compression spring, so that the respective gearwheel is received in the respectively internal gearing (i.e. the gear, which is arranged closer to the seat surface element 20). As a result, the respectively outer gear is rotatable in relation to the respective gearwheel 95, 64, 52 and thus also rotatable in relation to the respectively inner gear about the first rotary axis 59/the second rotary axis 69.

REFERENCE LIST 1 child seat
10 backrest
12, 12' outer struts
13 free space
14 longitudinal portion
15 releasing handle
16 lumbar support region
18, 18' backrest connecting element
19 upper end of backrest
20 seat surface element
22, 22' lateral ends
24 floor area
30, 30' adapter element
31, 31' adapter element halves
33 unlocking button
40 retaining element
42, 42' retaining element strut
50 first locking element
51 first cover
52 third gearwheel
53 gearwheel teeth of the third gearwheel
54 third internal gearing
55 grooves
56 first pull element
57 recess
58 third compression spring
59 first rotary axis
60 second locking element
61 second internal gearing
63, 63' projections of the backrest element
64 second gearwheel
65 grooves
69 second rotary axis
75 second compression spring
80 oblique element
81 projection
85 gliding surface
90 thrust ring
92, 92' thrust ring projection
95 first gearwheel
97 oblique projection
98 first compression spring
99 first internal gearing
105 second pull element
106 pull element recess
110 centre of first locking element
120 centre of second locking element
130 fourth internal gearing The claims are as follows:

1. A collapsible child seat, comprising
a backrest,
a seat surface element,
one adapter element or a number of adapter elements, by means of which the child seat is connectable to a pushchair frame, and
a first locking element, by means of which the seat surface element is lockable in relation to the one adapter element or more adapter elements,
wherein the first locking element is designed such that by reducing the angle between the backrest and the seat surface element the locking of the seat surface element is releasable in relation to the adapter element or adapter elements.

2. The child seat according to claim 1, wherein the child seat further comprises:

a retaining element for retaining a child in the child seat; and a second locking element for locking the retaining element in relation to the seat surface element, wherein the second locking element is designed such that by reducing the angle between the backrest and the seat surface element the locking of the retaining element in relation to the seat surface element is releasable.

3. The child seat according to claim 2, wherein the backrest and the seat surface element are rotatable about a first rotary axis.

4. The child seat according to claim 3, wherein the retaining element is rotatable about a second rotary axis.

5. The child seat according to claim 2, wherein the backrest and the seat surface element are rotatable about a first rotary axis and the retaining element is rotatable about a second rotary axis, and wherein the first rotary axis is not identical to the second rotary axis.

6. The child seat according to claim 1, wherein the backrest comprises a releasing device, in particular a releasing handle, wherein the releasing device is preferably arranged at an end of the backrest, which faces away from the first locking element, and the first locking element for locking the backrest in relation to the adapter element or adapter elements is formed in one or more positions, wherein the child seat is designed such that by operating the releasing device, in particular by pulling the releasing device away from the first locking element, the locking between the backrest and the adapter element or adapter elements is releasable, so that the angle between the backrest and the adapter element or adapter elements is reduceable.

7. The child seat according to claim 1, wherein the first locking element comprises a first gearwheel for locking the seat surface element in relation to the adapter element or adapter elements, wherein the first gearwheel, in the release position of the seat surface element, is rotatable about a first rotary axis.

8. The child seat according to claim 7, wherein the first gearwheel is movably arranged along the first rotary axis such that the first gearwheel is adapted to be disengaged from the adapter element and/or the seat surface element, and thus the locking of the seat surface element in relation to the adapter element or adapter elements is releasable.

9. The child seat according to claim 8, wherein a second locking element comprises a second gearwheel for locking the retaining element in relation to the seat surface element, wherein the second gearwheel, in the release position of the retaining element, is rotatable about a second rotary axis.

10. The child seat according to claim 9, wherein the second gearwheel is movably arranged along the second rotary axis such that the second gearwheel is adapted to be disengaged from the retaining element and/or the seat surface element and thus the locking of the retaining element in relation to the seat surface element is releasable.

11. The child seat according to claim 10, wherein the first locking element comprises a third gearwheel for locking the backrest in relation to the adapter element or adapter elements.

12. The child seat according to claim 11, wherein the child seat is designed such that by operating a releasing device the third gearwheel is adapted to be disengaged in order to release the locking between the backrest and the adapter element or adapter elements.

13. The child seat according to claim 11, wherein the first locking element is connected to the second locking element via a cable pull, in particular a Bowden cable.

14. A baby carriage, in particular a pushchair, buggy or similar vehicle for children, comprising a pushchair frame and a child seat according to claim 1.

* * * * *